United States Patent
Lawson et al.

(10) Patent No.: US 7,556,470 B2
(45) Date of Patent: Jul. 7, 2009

(54) NESTED-STACKED TIRE SEPARATOR AND BOTTOM UNSTACKER WITH INFLATOR

(75) Inventors: Lawrence J. Lawson, Troy, MI (US);
Lawrence L. Reece, Warren, MI (US);
Robert Reece, Clarkston, MI (US);
Richard J. Standen, Grosse Ile, MI (US)

(73) Assignee: Android Industries LLC, Auburn Hills, MI (US)

( * ) Notice: Subject to any disclaimer, the term of this patent is extended or adjusted under 35 U.S.C. 154(b) by 0 days.

(21) Appl. No.: 11/959,043

(22) Filed: Dec. 18, 2007

(65) Prior Publication Data

US 2008/0142416 A1 Jun. 19, 2008

Related U.S. Application Data

(60) Provisional application No. 60/870,570, filed on Dec. 18, 2006, provisional application No. 60/870,813, filed on Dec. 19, 2006.

(51) Int. Cl.
*B65G 59/10* (2006.01)
*B66C 1/54* (2006.01)
*B60C 25/132* (2006.01)
*B29D 30/00* (2006.01)

(52) U.S. Cl. .................. 414/795.6; 414/795.5; 294/93; 157/1.17; 264/501

(58) Field of Classification Search .................. 157/1.1, 157/1.17, 2, 15; 294/93, 94, 95, 97; 414/796, 414/796.1, 796.9, 797.4, 797.5, 797.7, 797.8, 414/798, 798.1, 798.2, 798.4, 910, 911; 264/230, 264/326, 36.14, 500–502, 912, DIG. 74
See application file for complete search history.

(56) References Cited

U.S. PATENT DOCUMENTS

| | | | |
|---|---|---|---|
| 2,701,736 A * | 2/1955 | Heppenstall | 294/94 |
| 3,033,605 A | 5/1962 | Morrow | |
| 3,131,961 A * | 5/1964 | Van Doros | 294/97 |
| 3,389,193 A * | 6/1968 | Hughes | 264/36.14 |
| 3,632,712 A | 1/1972 | Miller | |
| 3,955,491 A * | 5/1976 | McMahon | 100/7 |
| 4,117,053 A * | 9/1978 | MacMillen | 264/36.14 |
| 4,909,412 A | 3/1990 | Cerf | |
| 4,983,097 A * | 1/1991 | Ema et al. | 414/795.2 |
| 5,281,082 A | 1/1994 | Ghilardi et al. | |
| 5,365,781 A * | 11/1994 | Rhyne | 73/146 |
| 5,616,859 A * | 4/1997 | Rhyne | 73/146 |

FOREIGN PATENT DOCUMENTS

| | | | |
|---|---|---|---|
| JP | 61012527 A * | 1/1986 | |
| JP | 05039128 A * | 2/1993 | |
| JP | 07157091 A * | 6/1995 | |

* cited by examiner

*Primary Examiner*—Gregory W Adams
(74) *Attorney, Agent, or Firm*—Honigman Miller Schwartz & Cohn LLP

(57) ABSTRACT

A device for separating individual tires that have become entwined including a movable head for engaging at least one tire in a stack of tires, an engaging finger coupled to the movable head, and at least one manipulating apparatus for moving the engaging finger and the movable head to dislodge entwined tires.

22 Claims, 27 Drawing Sheets

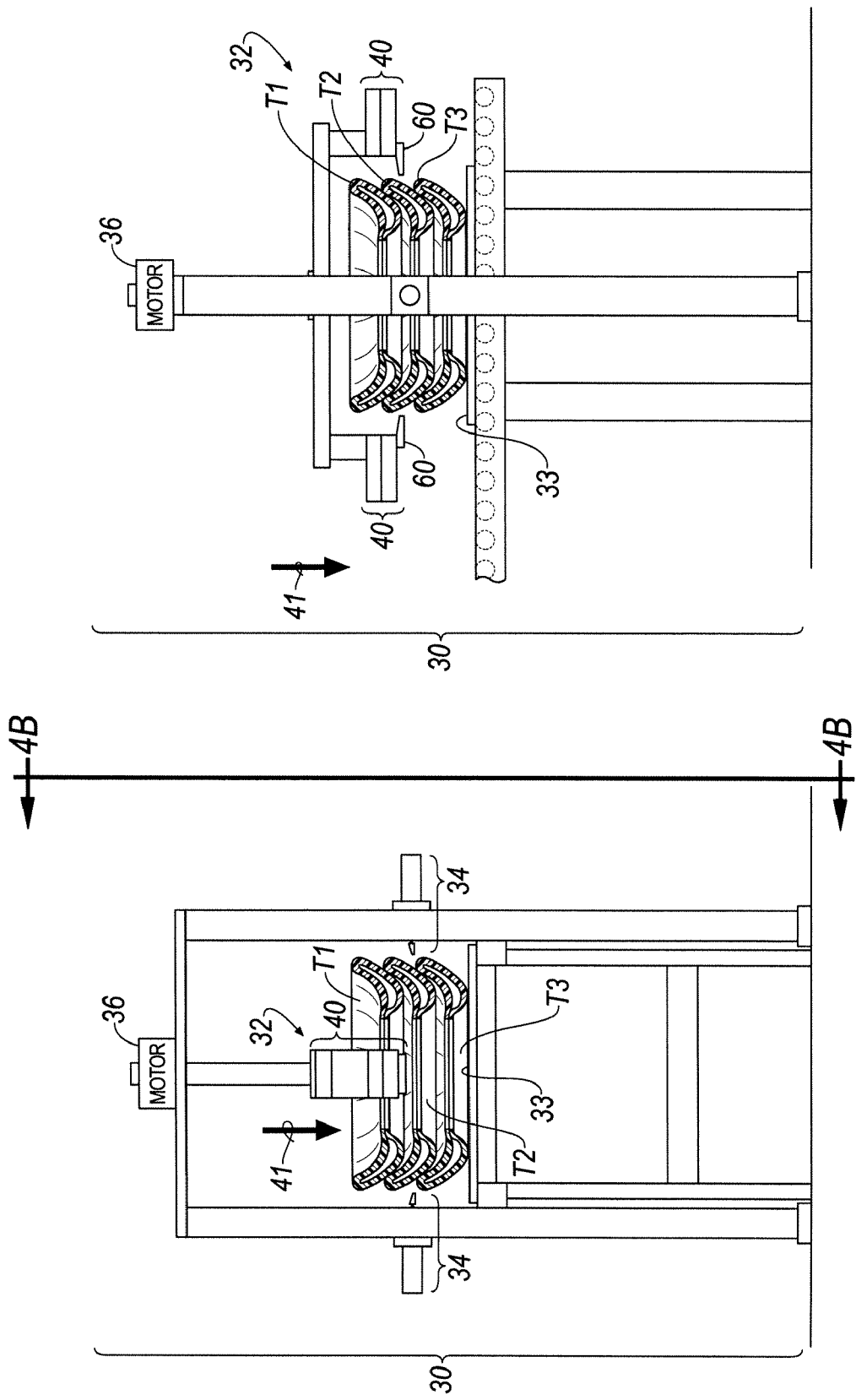

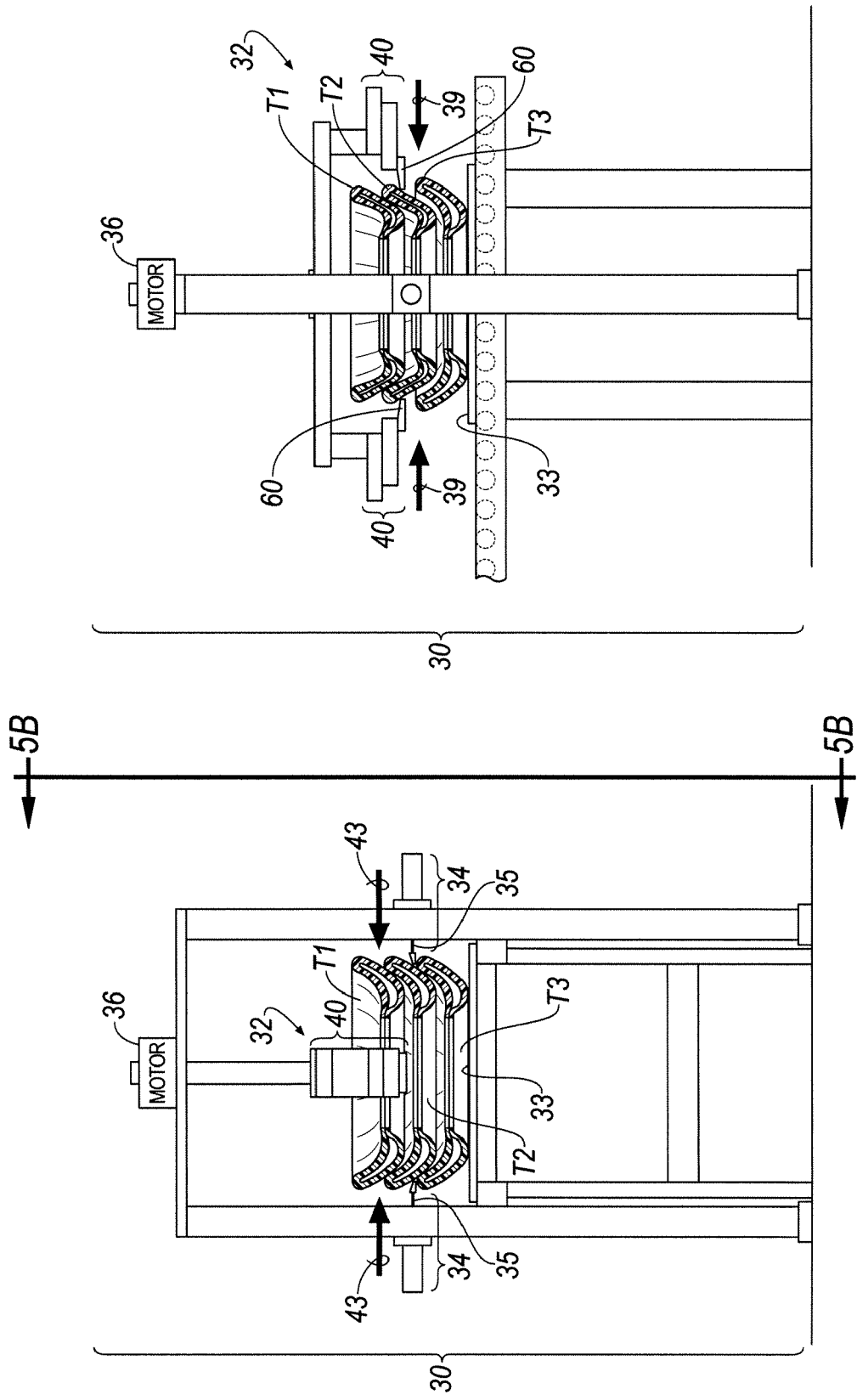

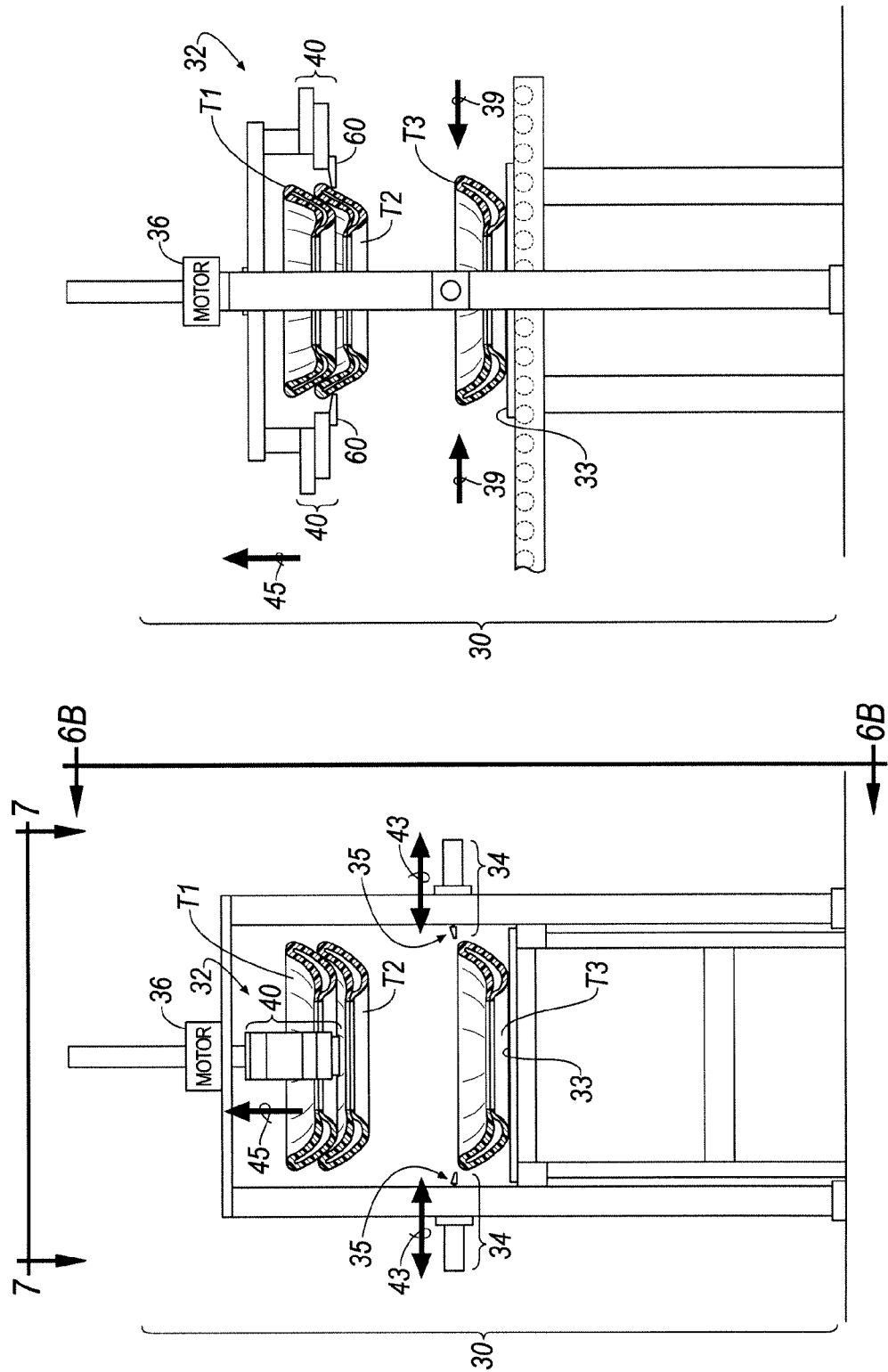

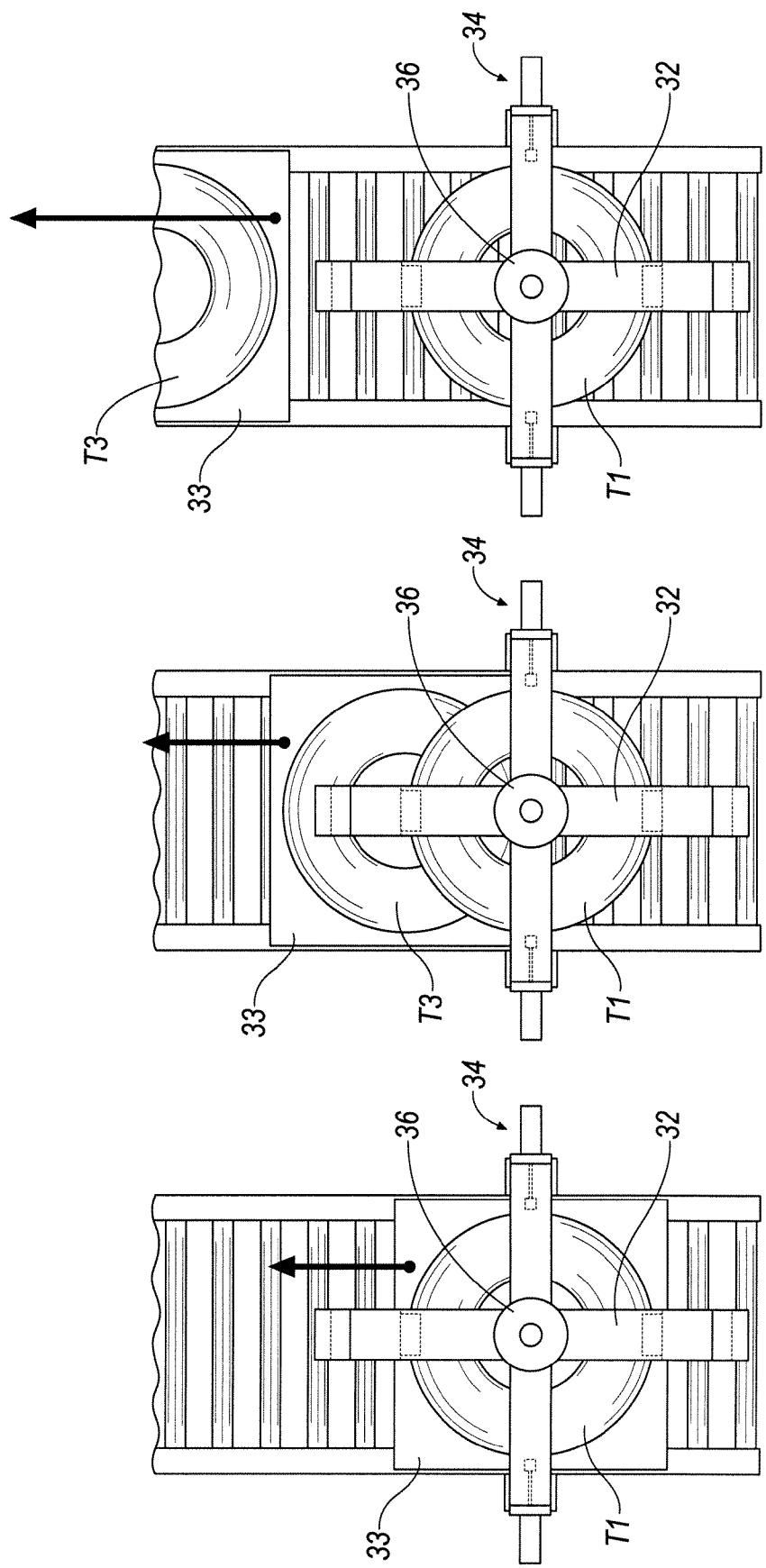

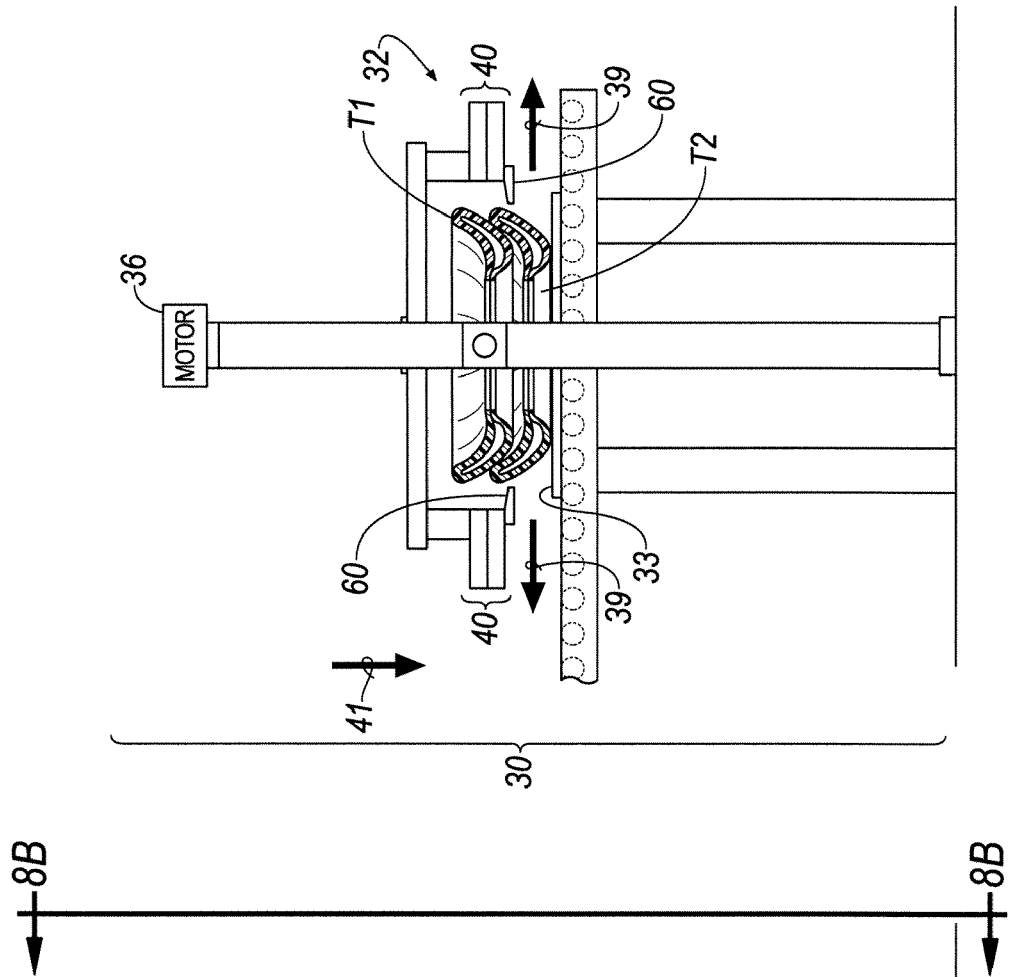
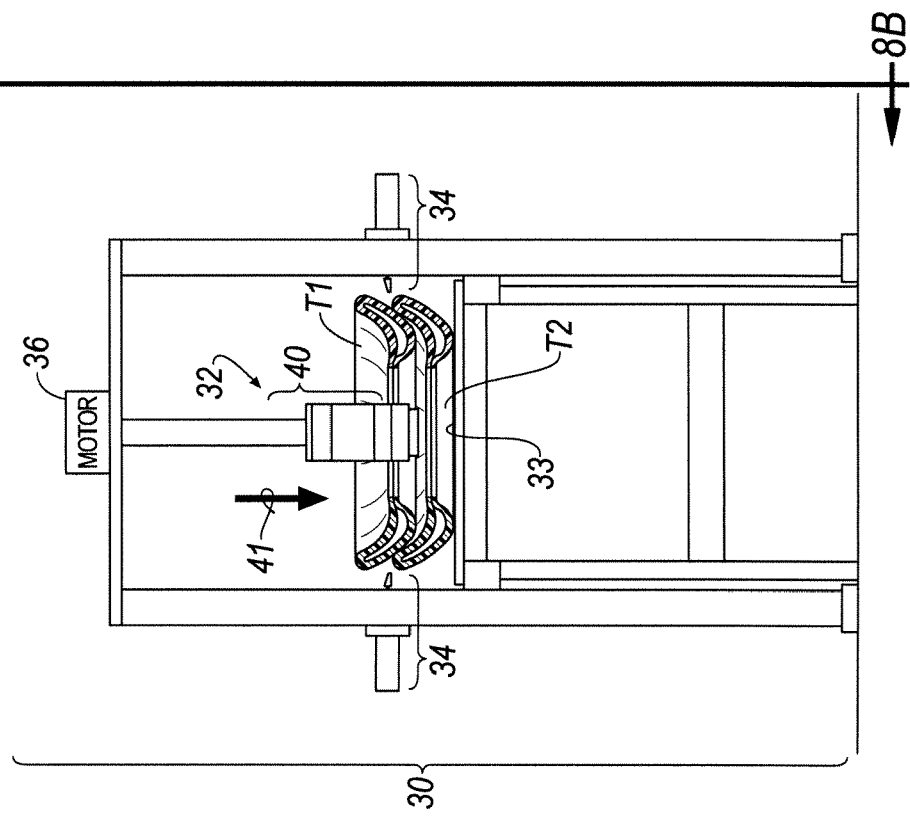
FIG. 8A
FIG. 8B

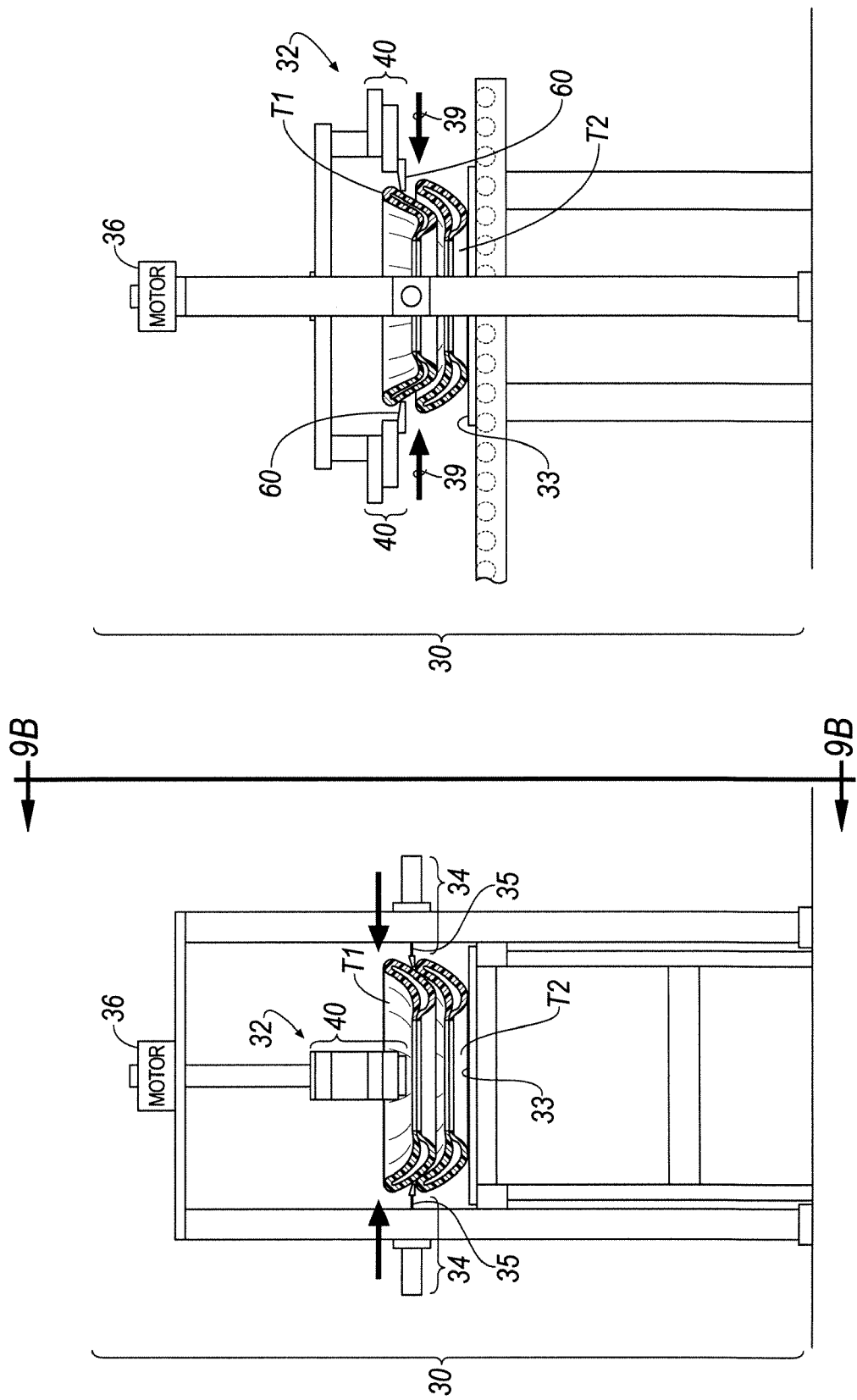

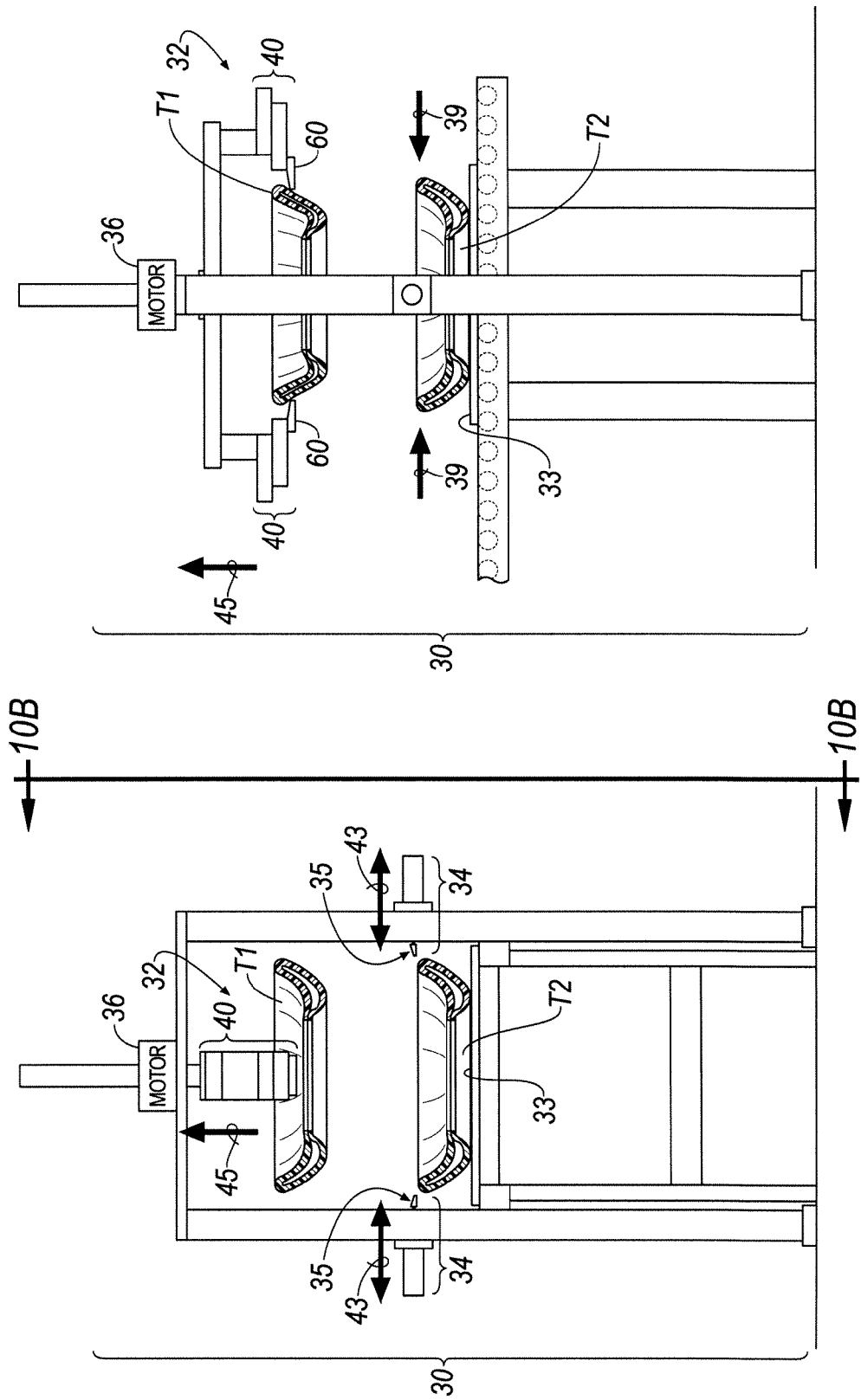

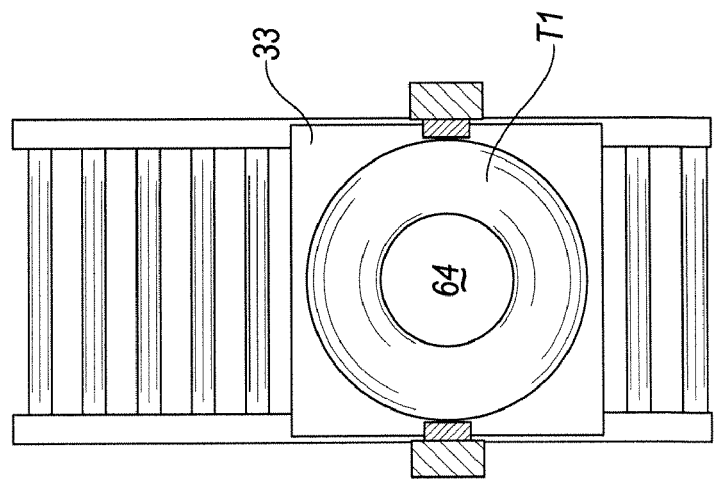
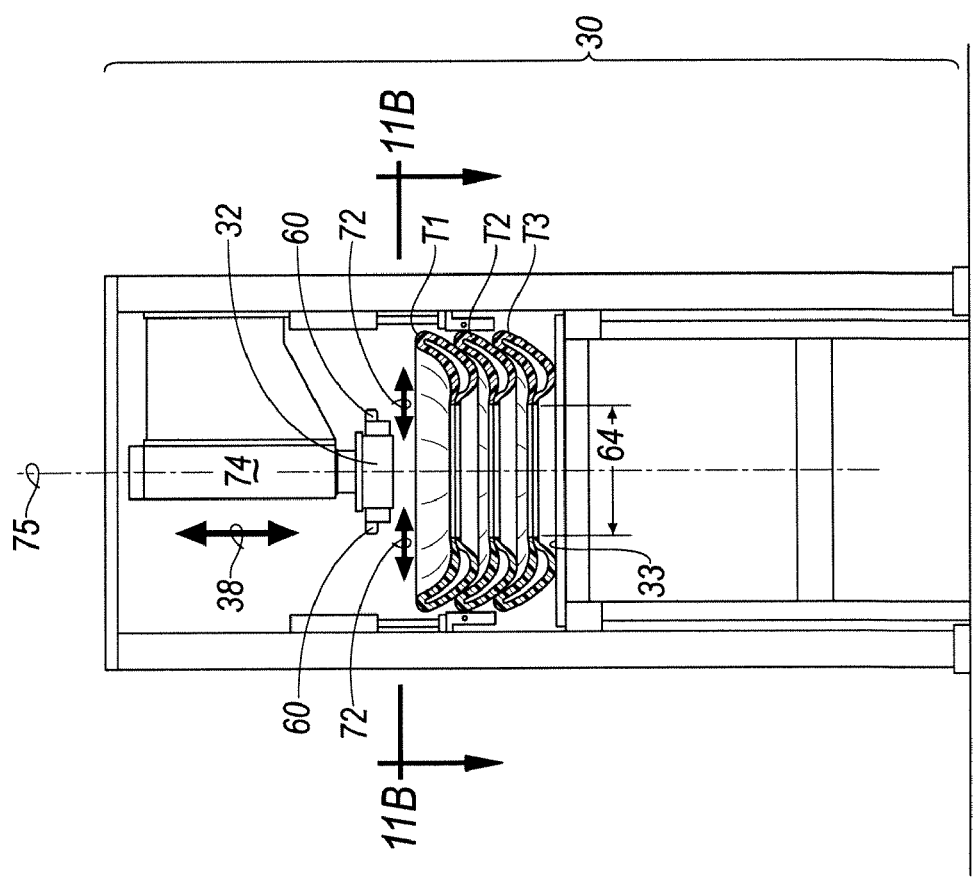
FIG. 11B
FIG. 11A

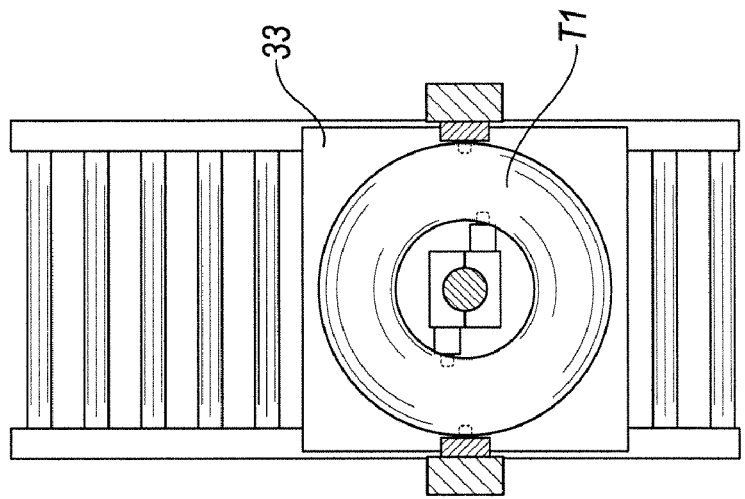
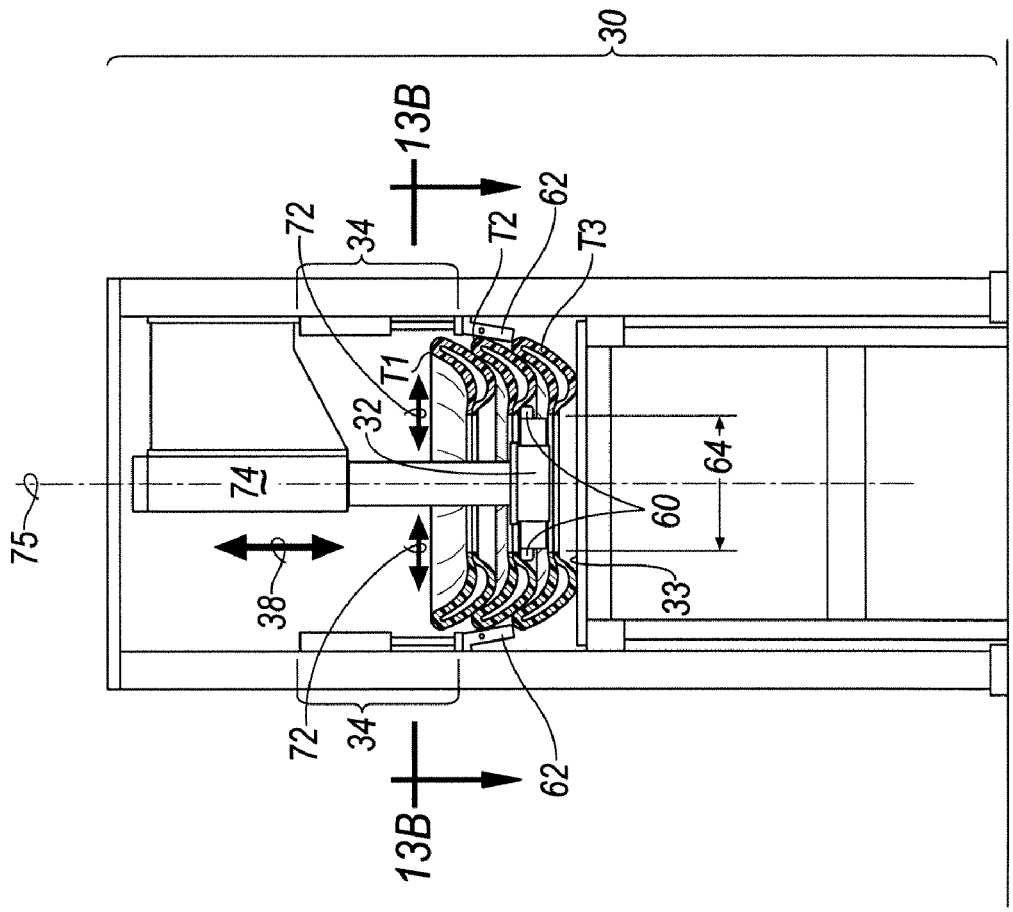
FIG. 13B
FIG. 13A

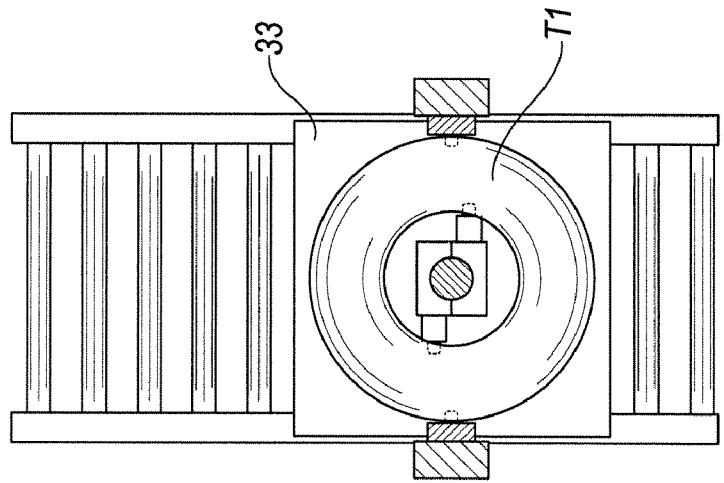
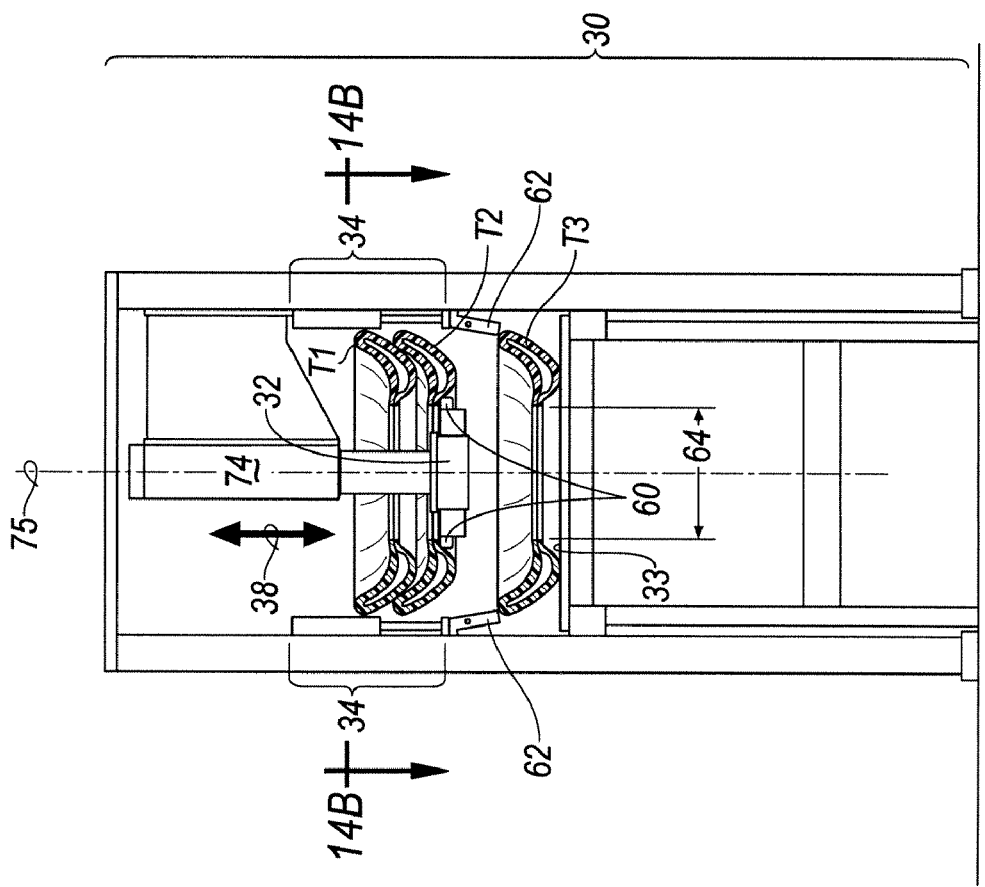
FIG. 14B
FIG. 14A

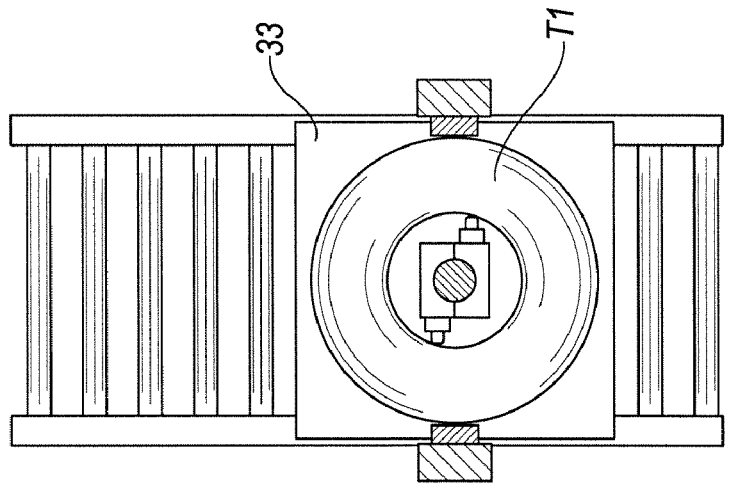
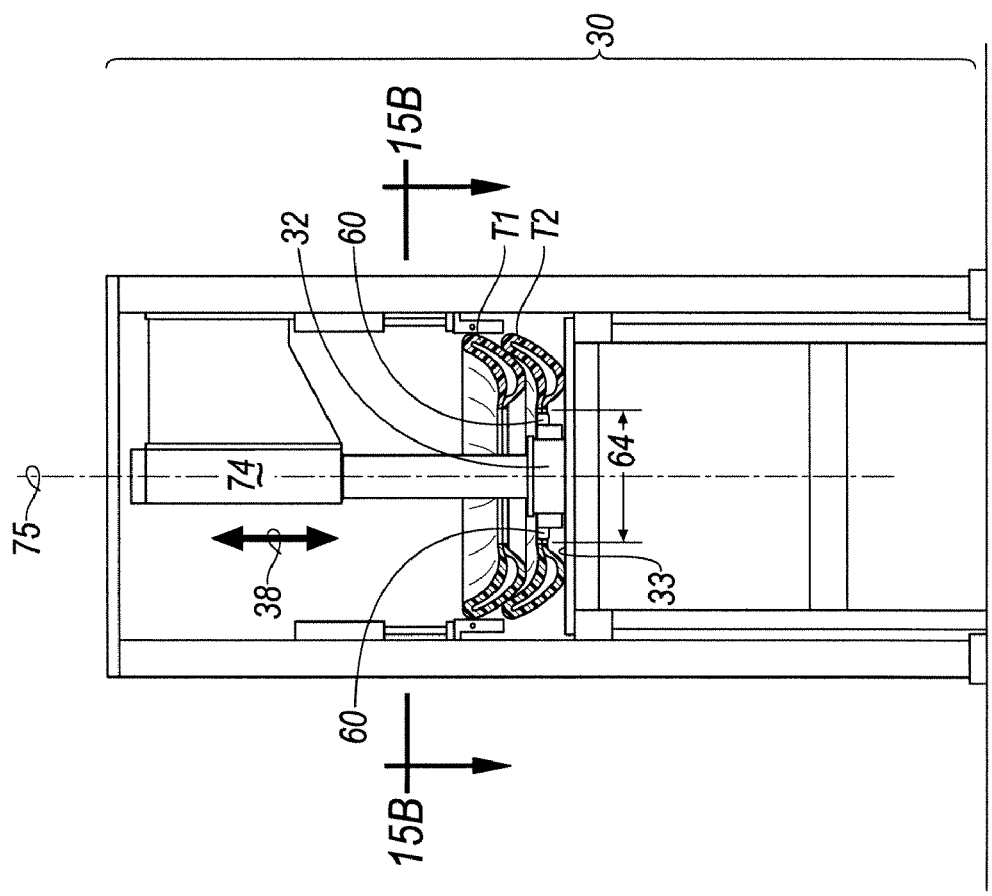
FIG. 15B
FIG. 15A

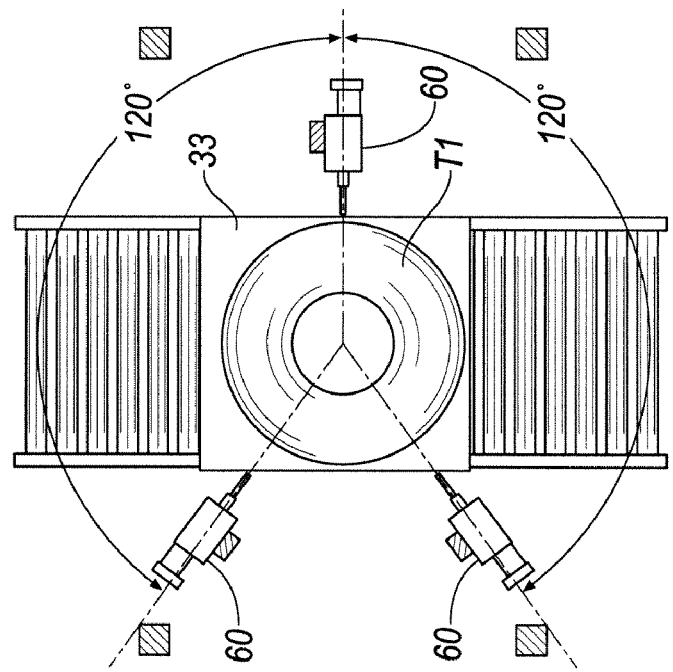
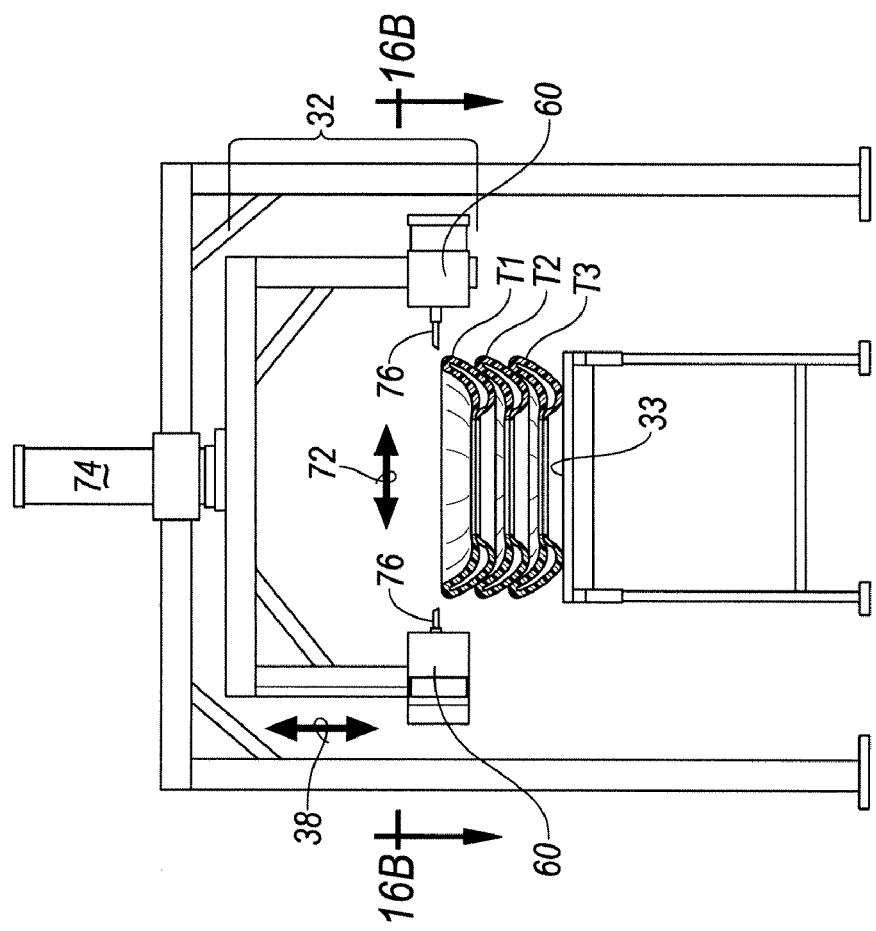
FIG. 16B
FIG. 16A

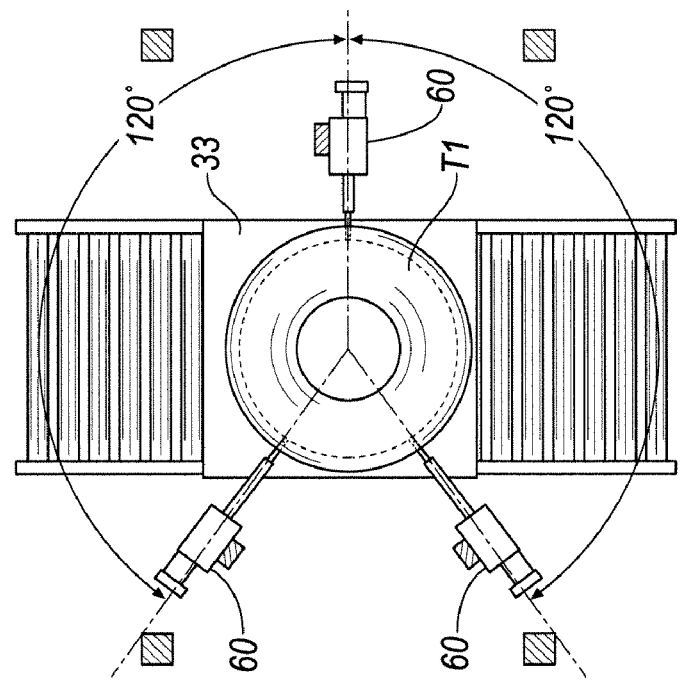
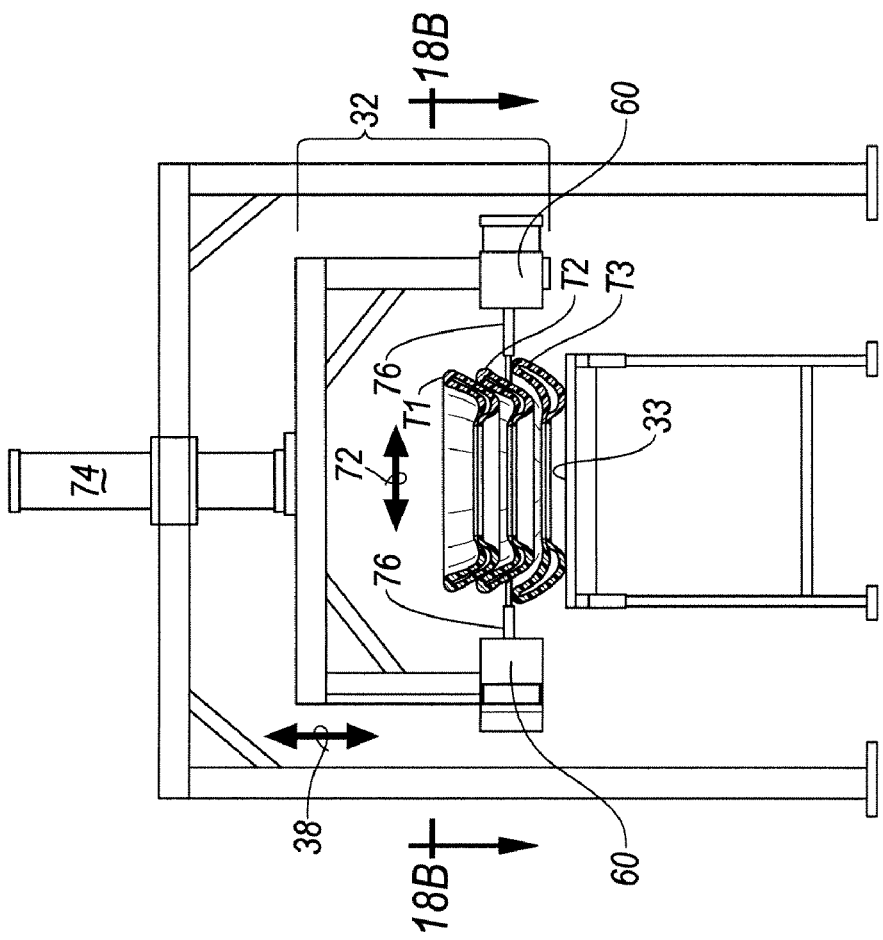
FIG. 18B
FIG. 18A

US 7,556,470 B2

NESTED-STACKED TIRE SEPARATOR AND BOTTOM UNSTACKER WITH INFLATOR

CROSS-REFERENCE TO RELATED APPLICATIONS

This application claims priority to application serial number 60/870,570 filed on Dec. 18, 2006 and also claims priority to application serial number 60/870,813 filed on Dec. 19, 2006.

BACKGROUND OF THE INVENTION

In order to minimize shipping and transportation costs, vehicle tires are often interwoven and stacked in order to maximize their packing density. For example, when tires are shipped from overseas, they are commonly configured into a bowl shaped frustum (i.e. in the general shape of a cone or in the shape of a partial cone). By distorting the tire into a frustum, tires can be stacked (i.e. nested) one on top of the other much like ice cream cones are commonly packaged. Although this packaging arrangement minimizes shipping costs by maximizing tire packing densities, it poses a number of problems relating to separating the tires. Specifically, the tires tend to lodge one within the other whereby they are difficult to separate.

The present invention overcomes the difficulties associated with separating stacked tires and provides an apparatus and method for separating stacked tires.

BRIEF DESCRIPTION OF THE DRAWINGS

FIG. 4A is a front elevational view of the separator of FIG. 1 wherein the separator lifting head has been lowered;

FIG. 4B is a right side view taken along 4B-4B of FIG. 4A.

FIG. 5A is a front elevational view of the tire separator of FIG. 1 wherein the separator lifting head engaging arms have engaged one of the stacked tires;

FIG. 5B is a right side view taken along 5B-5B of FIG. 5A;

FIG. 6A is a front elevational view of the tire separator of FIG. 1 wherein the separator lifting head has lifted two of the stacked tires away from the bottom-most tire;

FIG. 6B is a right side view taken along 6B-6B of FIG. 6A;

FIGS. 7A, 7B and 7C are top views taken along lines 7-7 of FIG. 6A showing various stages of the movement of the bottom-most tire of FIG. 6A as it moves away from the stacked tire separator toward the next work station;

FIG. 8A is a front elevational view of the tire separator of FIG. 1 wherein the separator lifting head has lowered the two tires that it elevated in FIGS. 6A and 6B.

FIG. 8B is a right side elevational view taken substantially along lines 8B-8B of FIG. 8A.

FIGS. 9A-10B are a repeat of the cycle depicted on FIGS. 5A-6B wherein the bottom-most tire is separated from the tire immediately above it.

FIGS. 11A and 11B are, respectively, a front elevational view, and a top plan view of yet another embodiment of the separator of the present invention;

FIGS. 13A and 13B is, respectively, a front and a top view of the tire separator of FIG. 11A wherein the lifting head extends engaging finger portions 60 of lifting head 32 and securing arms 34 extend locking fingers 62;

FIGS. 14A and 14B depict the tire separator of FIG. 11A wherein the lifting head 32 has lifted the two upper-most stacked tires away from the bottom-most tire;

FIGS. 15A and 15B are respectively a front and a top view of the separator of FIG. 11A wherein the lower most, separated, tire has been removed from the separator work station and the upper two most tires have been lowered against work surface 33 to start the cycle over again;

FIGS. 16A and 16B are front elevational and top views respectively of yet another embodiment of the stacked tire separator of the present invention;

FIGS. 18A and 18B depict the separator embodiment shown in FIGS. 16A and 16B wherein the engaging finger portions of the lifting head are shown in an extended, tire engaging position;

DETAILED DESCRIPTION OF THE INVENTION

Figures 1, 2:
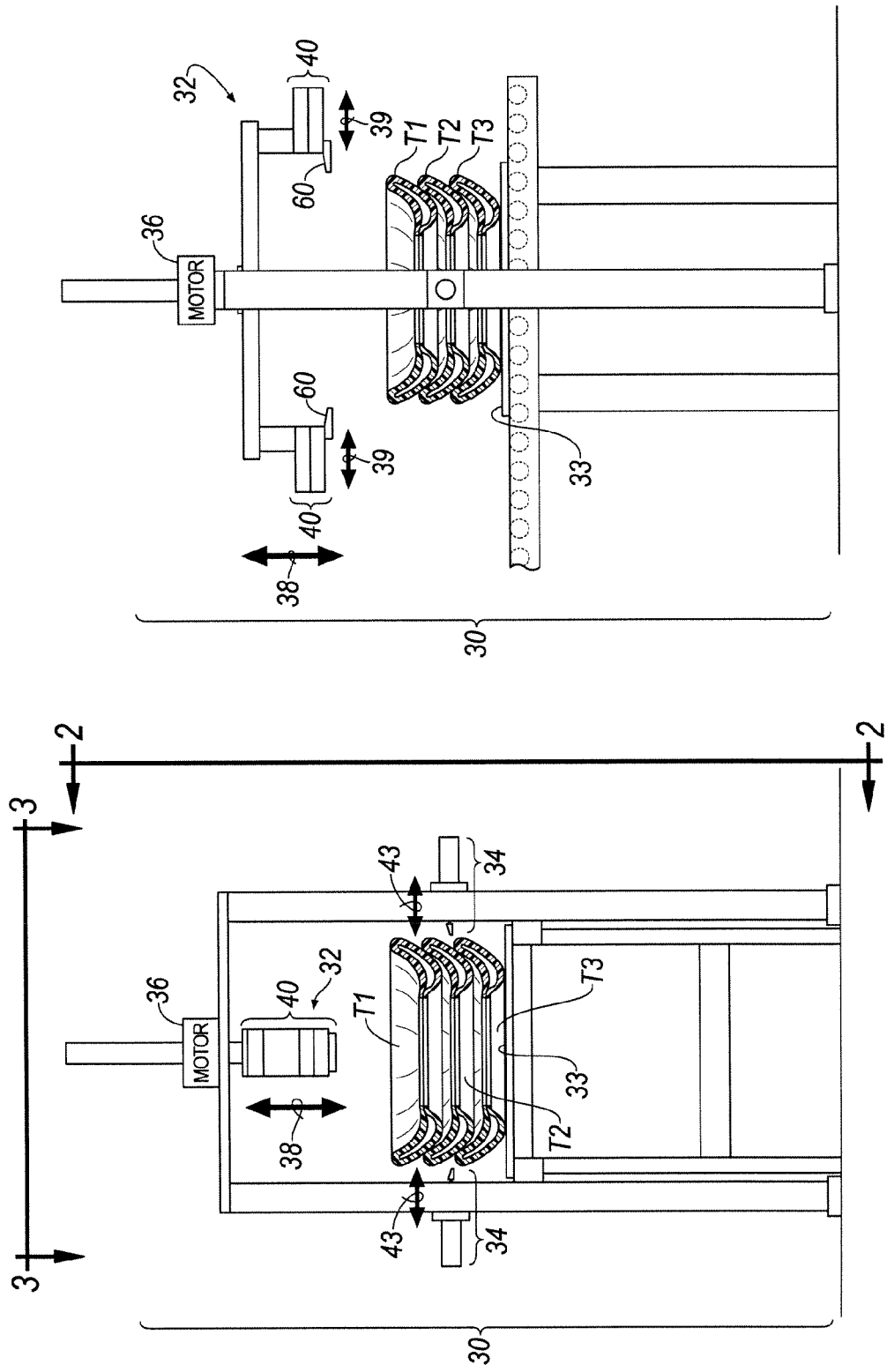
FIG. 1 is a front elevational view of an embodiment of a stacked tire separator of the present invention wherein three stacked tires are disposed proximate the separator.
FIG. 2 is a right side elevational view of the embodiment of FIG. 1.
Figure 3:
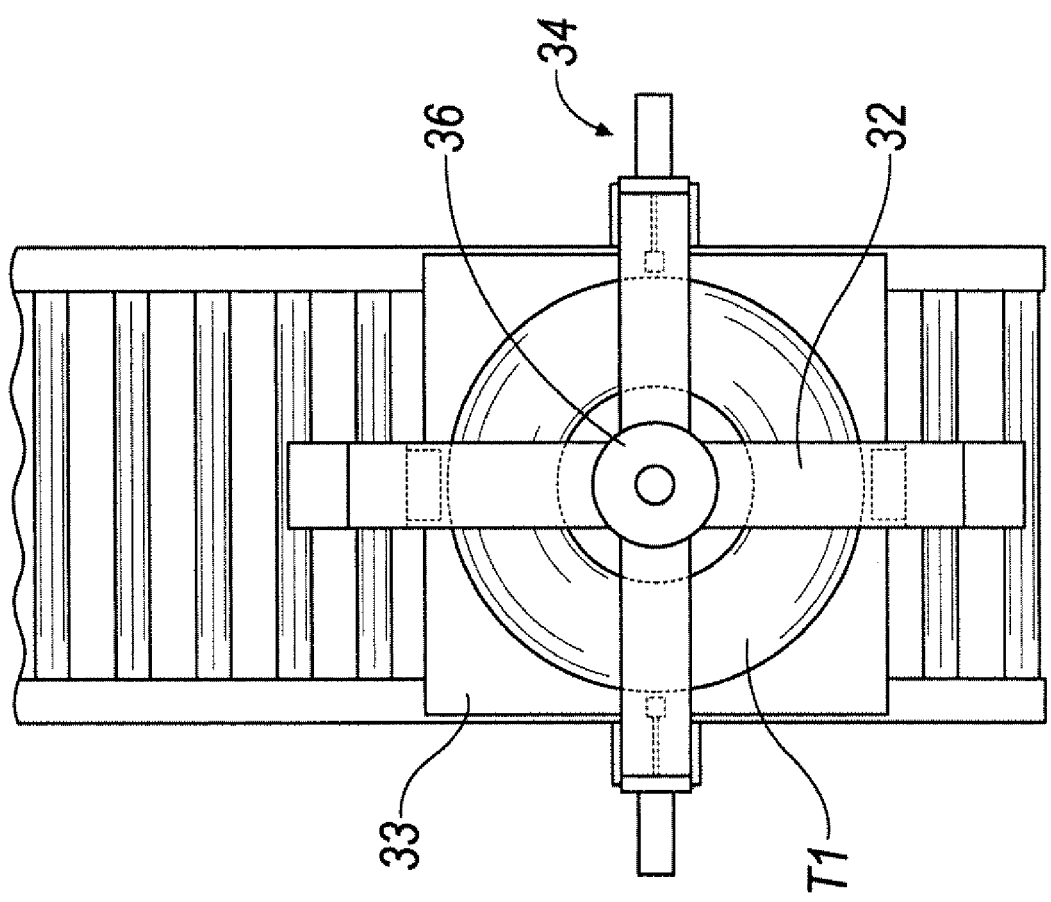
FIG. 3 is a top view taken along lines 3-3 of FIG. 1.
Figure 12B:
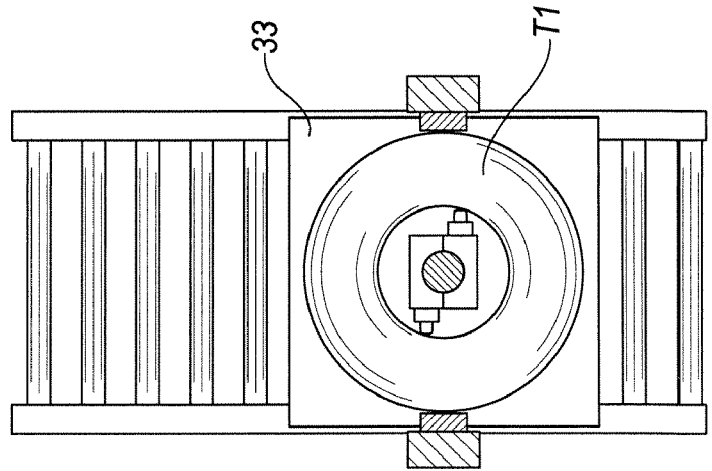
FIGS. 12A and 12B are, respectively, front and top view of the separator of FIG. 11A wherein the upper lifting head is lowered between the center opening of a plurality of stacked wheels.
Figure 12A:
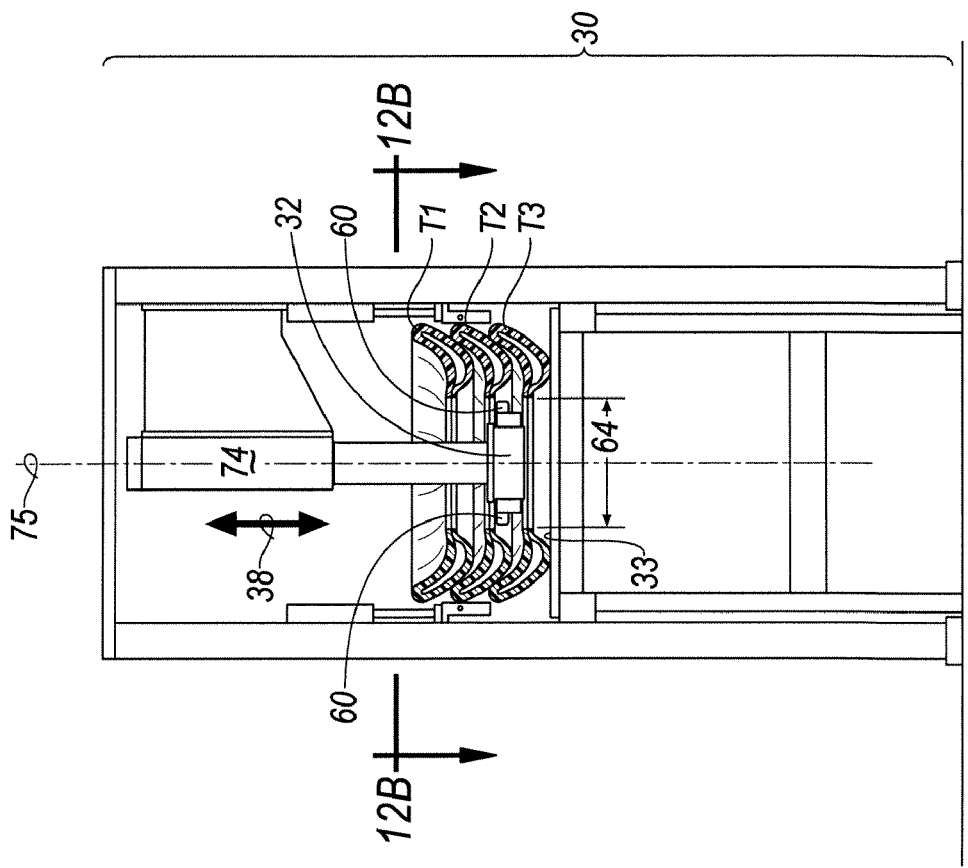
Figure 17B:
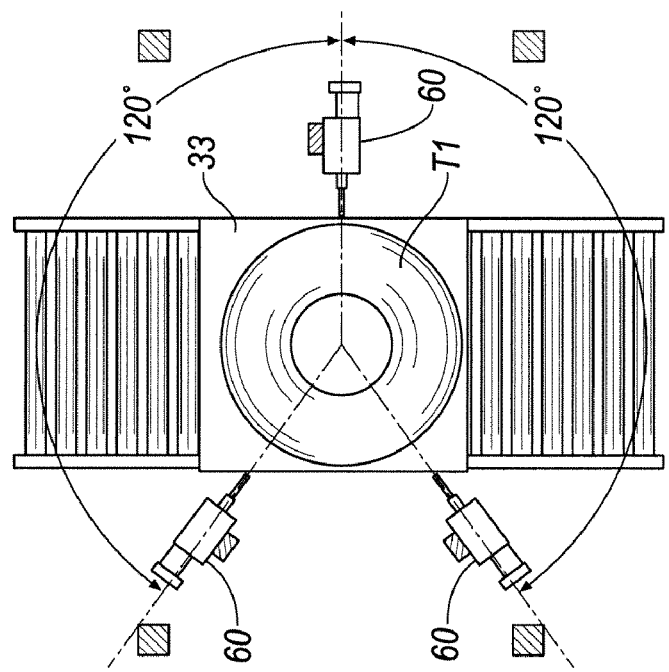
FIGS. 17A and 17B depict, respectively, the separator in FIGS. 16A and 16B wherein the lifting head 32 is shown in a lowered position.
Figure 17A:
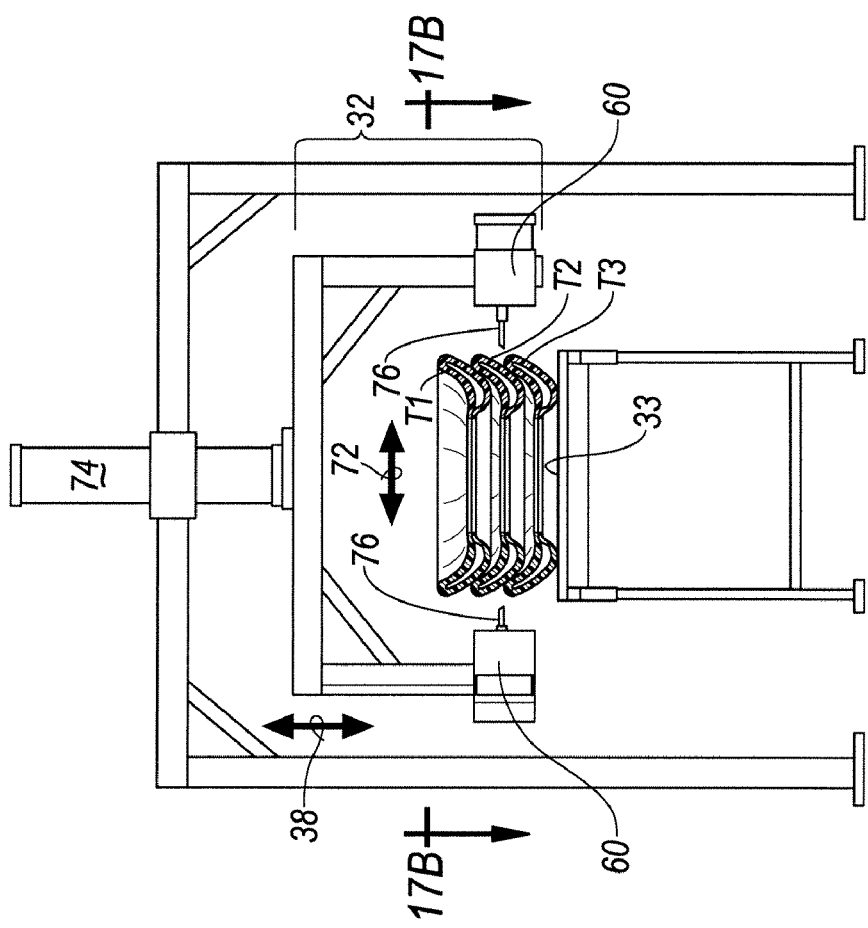
Figure 19B:
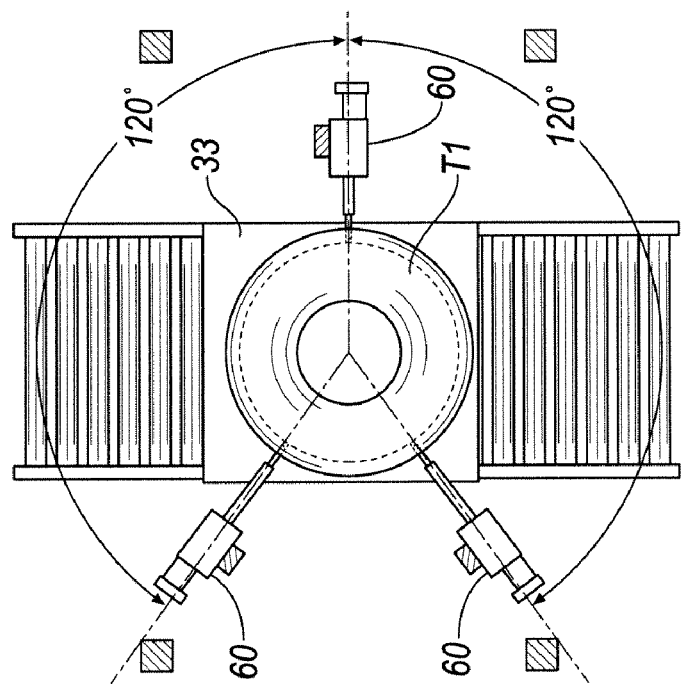
FIGS. 19A and 19B depict the separator of FIGS. 16A wherein the lifting head 32 is raised thereby lifting two stacked tires away from a bottom-most tire.
Figure 19A:
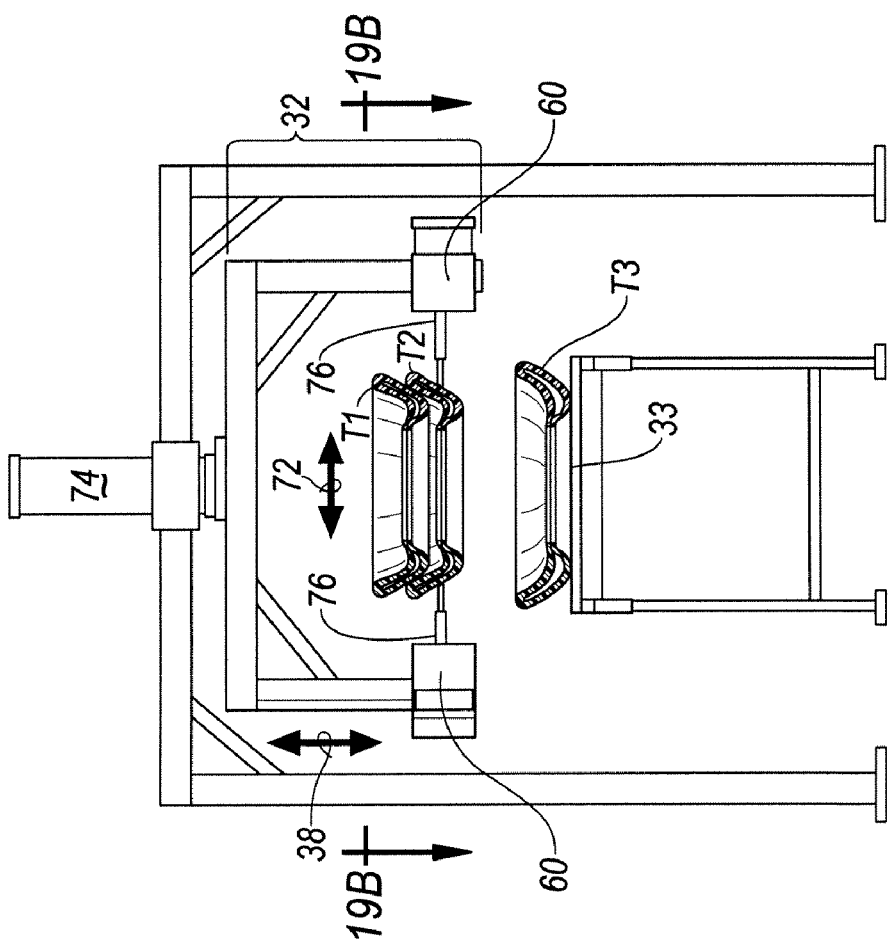
Figure 20B:
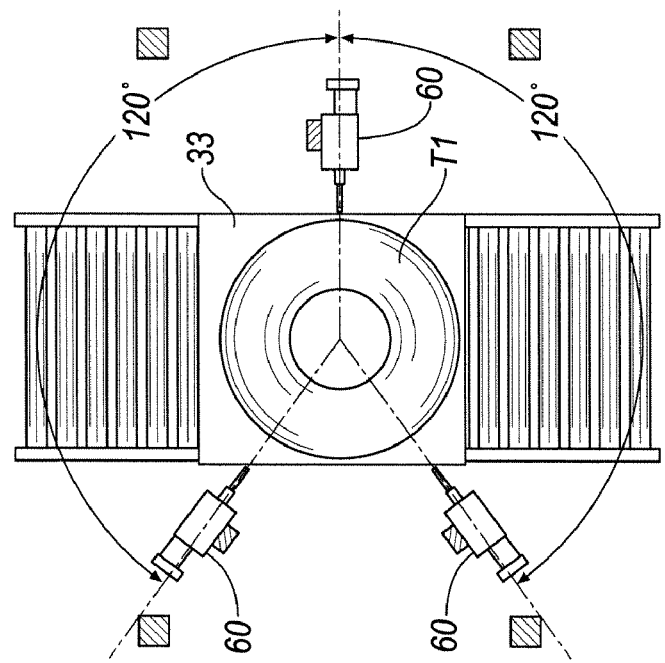
FIGS. 20A and 20B depict the separator of FIG. 16A wherein the lifting heads had been lowered and the engaging finger portions of the lifting head have been retracted thereby placing the remaining stacked tires on top of work surface 33 and thereby readying the system for the next cycle.
Figure 20A:
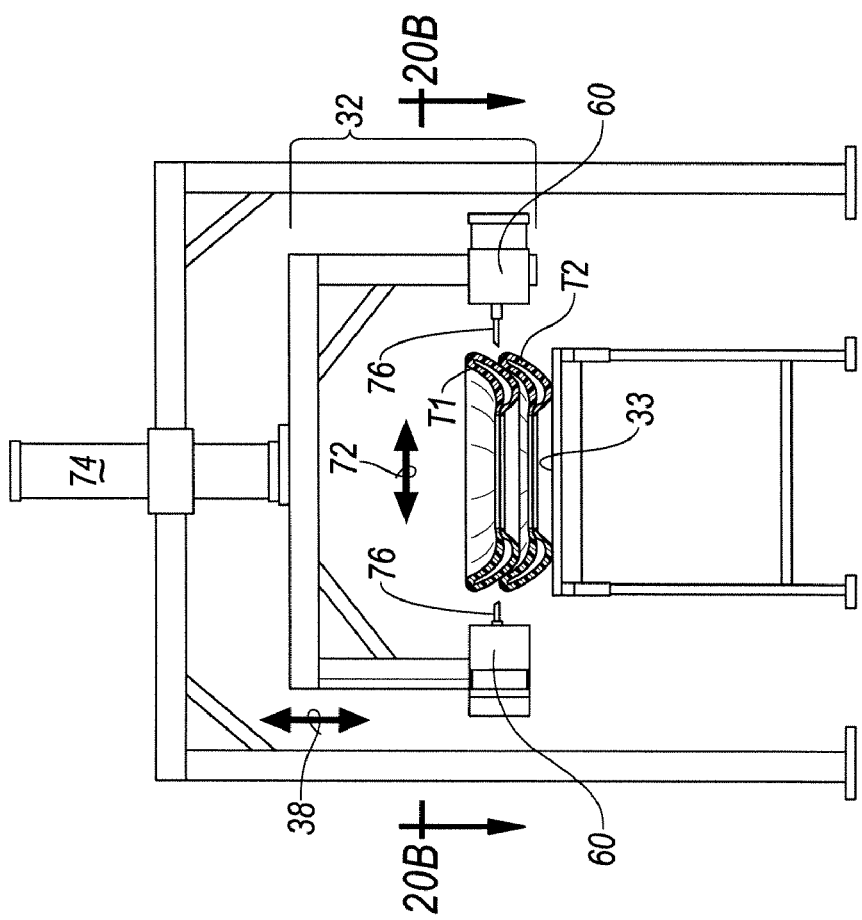

Tire separator 30 may include lifting head 32 and one or more securing arms 34. Lifting head 32 may include lifting motor 36 which is attached to lifting head 32 and designed to manipulate lifting head 32 along a vertical axis 38. Motor 36 may be a cylinder which is activated hydraulically, pneumatically, electrically, etc or it may be a conventional rotary electric motor. Lifting head 32 may include one or more lifting arms 40. One or more lifting arms 40 are adapted to have a portion thereof (i.e. engaging fingers 60) move in and out along a horizontal axis 39. Securing arms 34 are also designed to have a portion thereof move in and out along a horizontal axis 43. Securing arms 34 are not attached to lifting head 32 but rather they may be fixed relative to work surface 33. The horizontal axis 39 as traversed by lifting arms 40 is depicted generally parallel to the horizontal 43 axis moved by horizontally movable portions of securing arms 34; however, other angular orientations between the two axes are contemplated. In the embodiment shown in FIG. 1, the one or more lifting arms 40 move along vertical axis 38 which is generally perpendicular to the vertical movement 34 of securing arms 34 although this perpendicular orientation is not critical to the present invention.

Now referring to FIGS. 1, 2, 3, 4 and 5, a series of three stacked tires T1, T2, T3 are presented to tire separator 30. Three tires T1, T2 and T3 are shown schematically in a cross-sectional view each distorted into a bowl shaped frustum and stacked (i.e. nested) one on top of the other.

In the first step, lifting head 32 is lowered 41 to a height such that when one or more lifting arms 40 are extended horizontally 43, and engaged against a tire in the tire stack T1, T2, T3, the lifting arms 40 engage an outer circumferential portion of the penultimate bottom tire T2 (i.e. the tire which is next to the bottom-most tire T3). Next (see FIGS. 5A and 5B), a horizontally displaceable portion of securing arms 34 (e.g. gripping portion 35) are extended 43 such that the gripping portion 35 engage the bottom-most tire to prevent upward movement of the bottom-most tire.

Now referring to FIGS. 6A and 6B next, lift motor 36 is activated to raise 45 lifting head 32. This in turn raises one or more lifting arms 40. During the lifting action, the bottom-most tire T3 is prohibited from significant upward movement by virtue of being engaged by gripping portions 35 of securing arms 34. Accordingly, when lifting head 32 is raised, the bottom-most tire T3 is constrained and all tires T1, T2 located above the bottom-most tire are separated from the bottom-most tire T3.

FIGS. 7A-7C depict the removal of the bottom-most tire T3 from tire separators 30 by way of a roller table. Although a roller table is shown in FIGS. 7A-7C, any mechanism well-known to those skilled in the art, can be used for removing the lower-most tire T3 from the stack including motorized carts, robotic arms, conveyor belts and the like.

FIGS. 8A, 8B, 9A, 9B, 10A and 10B depict the same sequence as that which has been used to described tire separator 30 in FIGS. 1-7C. The only difference is the depiction of FIGS. 8A, 8B, 9A, 9B, 10A and 10B is that there are only two stacked tires T1, T2 depicted in FIGS. 8A-10B (wherein there are three stacked tires T1, T2, and T3, depicted in FIGS. 1-7B). Although tire separator 30 has been depicted separating a stack of three tires, it will be obvious to one skilled in the art that this system may be used to separate any number of stacked tires from one another.

Now referring to FIGS. 11A-15B, an additional embodiment of the stacked tire separator is shown. The tire separator of FIGS. 11A-15B possesses many similarities to the tire separator shown in FIGS. 1-10B. In view of the numerous similarities, only the points of distinction will be discussed herein. Separator 30 includes a lifting head 32 which is movable along a first axis 38. Axis 38 may be a vertically disposed axis, however, nothing herein shall limit the orientation of axis 38 to that of a vertical axis. The separator 30 shown herein can operate in any orientation. Lifting head 32 is small enough to at least partially fit within an internal opening 64 defined by the bead seat portion of tires T1, T2 and T3. Tires T1, T2, and T3 are manipulated into a shape which generally resembles a bowl shaped frustum and stacked one on top of the other. Lifting head 32 includes one or more engaging fingers 60 which are selectively movable in a horizontal direction 72. An electro/mechanical/hydraulic actuator (not shown) for actuating the horizontal directional movement 72 of engagement finger 60 can be mounted within lifting head 32 or it can be mounted elsewhere and mechanically coupled from a remote location to engaging fingers 60. Likewise the actuator 74 for effecting the movement of lifting head 32 can be mounted directly to separator 30 or can be mounted elsewhere and it can be mechanically coupled from a remote location to actuator 74.

Stacked tires T1-T3 are manipulated on work surface 33 such that the internal opening 64 of the stacked tires T1-T3 are generally aligned (i.e. co-axial) with the central axis 75 of lifting head 32. Next, actuator 74 which is coupled to lifting head 32 is actuated thereby lowering lifting head 32 through one or more internal openings 64 into a first lowered position (see FIG. 12A and FIG. 12B). Next, the engaging finger portions 60 of lifting head 32 are extended and the locking finger portions 62 of securing arms 34 are also extended (see FIG. 13A and FIG. 13B). Finger portions 60 are adapted to engage an inner circumferential portion of the tire T2. Next, actuator 74 is activated thereby moving lifting head 32 upwardly 38 carrying upper stacked tire T1 and intermediate stacked tire T2. Lower stacked tire T3 remains resting upon work surface 33 by virtue of the impedance to upward movement it experiences by locking fingers 62 (see FIG. 14A) when lifting head 32 moves tire T1 and T2 upwardly. Next, lower tire T3 is transported out of position and head 32 is lowered (see FIG. 15A) thereby lowering tire T1 and tire T2. Separator 30 is now ready to repeat the motion described herein in conjunction with FIGS. 11A-15B to separate tire T1 from tire T2.

Now referring to FIGS. 16A and 16B, the tire separator of FIGS. 16A and 16B depicts yet another embodiment of the present invention. This embodiment is, in many ways, similar to the embodiments already discussed and accordingly, only the differences will be disclosed herein. Lifting head 32 is manipulateable along an axis 38 by way of actuator 74. Actuator 74 can be any number of known actuators including, but not limited to, hydraulic, pneumatic, electrical, mechanical and the like. Lifting head 32 carries at least one engaging finger assembly 60. Each engaging finger assembly 60 includes an actuator for moving an engaging finger 76 generally along a horizontal direction 72. The embodiment shown in FIGS. 16A-20B depicts three separate engaging finger portions (generally spaced 120° apart). However, less than three engaging finger portions could be used as well as embodiments which carry more than three engaging fingers portion.

Now referring to FIGS. 16A and 16B, once stacked tires T1-T3 are placed proximate to lifting head 32, actuator 74 is activated thereby lowering lifting head 32 into a predetermined position. Once lifting head 32 is lowered into the proper predetermined position, engaging fingers 76 are generally deployed in a horizontal plane (see FIG. 18A) that intersects the second from the bottom stacked tire T2 (i.e. the penultimate stacked tire). In the example of FIG. 16A, the penultimate stacked tire is tire number T2. The stroke traveled by engaging finger 76 is dimensioned such that the penultimate tire T2 is deformed (upwardly and/or radially inwardly) to such an extent that it releases any frictional grip it may have with the immediate lower tire (in this example, tire T3), thereby causing dislodgement between the lower tire T3 and adjacent tire T2. Next, (see FIG. 19A) lifting head 32 is manipulated upwardly 38 by actuator 74 thereby lifting the upper tires T1, T2 away from the lower most tires T3. Lastly, (see FIG. 20A) the lower most tire is shuttled away and the two upper most tires are lowered thereby allowing the tire separation sequence to begin its separation sequence once again.

Figure 21:
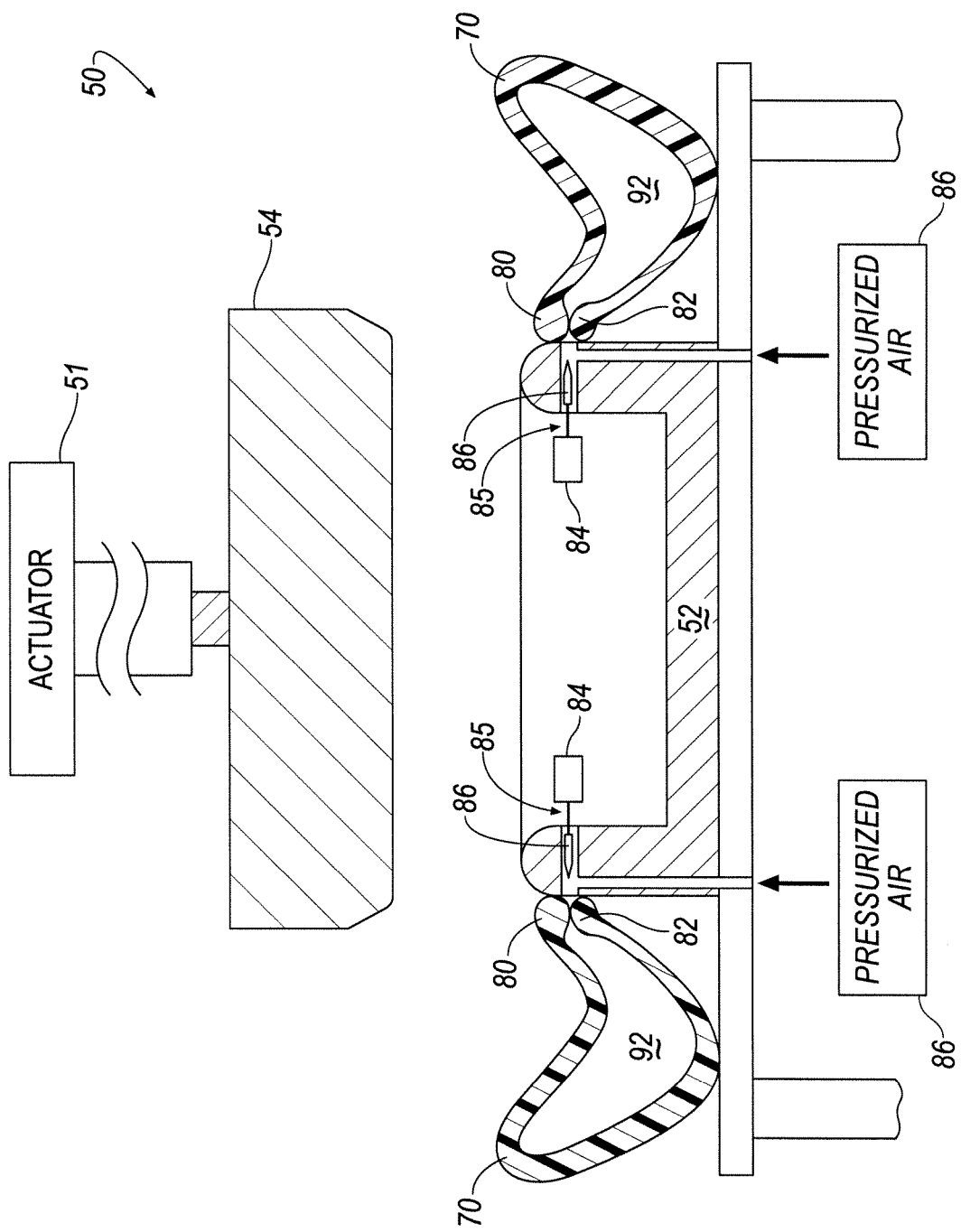
FIG. 21 is an additional embodiment of an inflator of the present invention.

Now referring to FIG. 21, once a stacked tire is separated (using the separator 30), it may be presented to tire inflator 50. Tire inflator 50 includes head 54 which is manipulateable in an upward and downward direction (by actuator 51) and inflator 50 may also include a bottom sealing ring or mandrel 52 (see FIG. 21). Once the tire 70 is in place (i.e. engaged with bottom sealing ring 52), head 54 is lowered to engage an inner periphery portion (e.g. the bead portion) of the tire 70 (see FIG. 22) and pressurized air is passed into an inner volume 92 defined at least partially by the inner walls of tire 70, the upper sealing head 54, and the bottom sealing ring 52. By introducing pressurized air into the inner volume 92 while the inflating head and the bottom sealing ring are in place, the air introduced therein exerts an outward force against the tire 70 and causes it to inflate (see FIGS. 23 and 24) thereby assuming a general shape that will facilitate mounting the tire 70 to a wheel. Pressurized air can be introduced into the volume 92 by way of one or more air channels 81 formed in the bottom sealing ring 52, the upper sealing head (not shown), or by way of any other means that has fluid access to volume 92.

Figure 22:
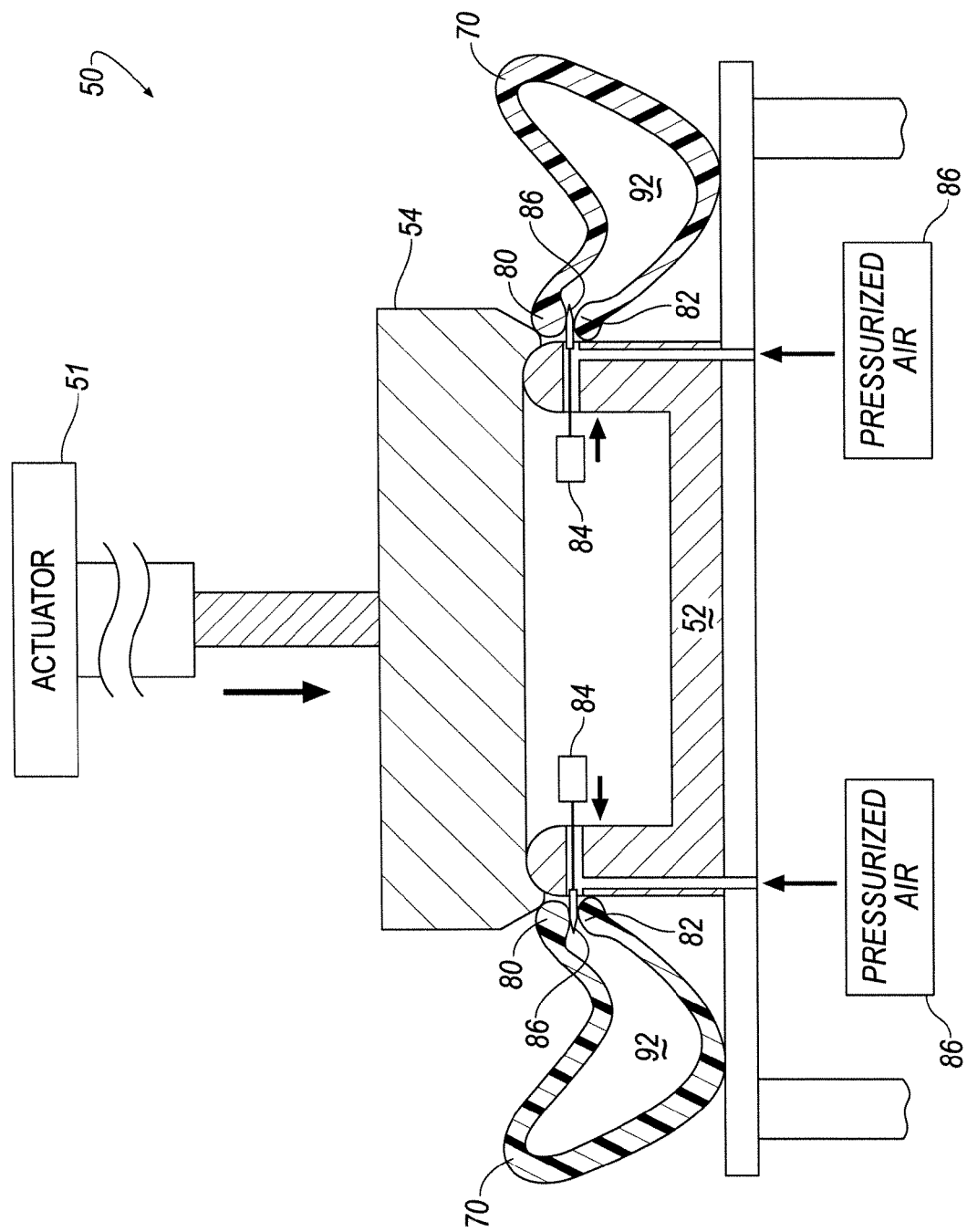
FIG. 22 is the inflator of FIG. 21 shown in a first stage of tire inflation.
Figure 23:
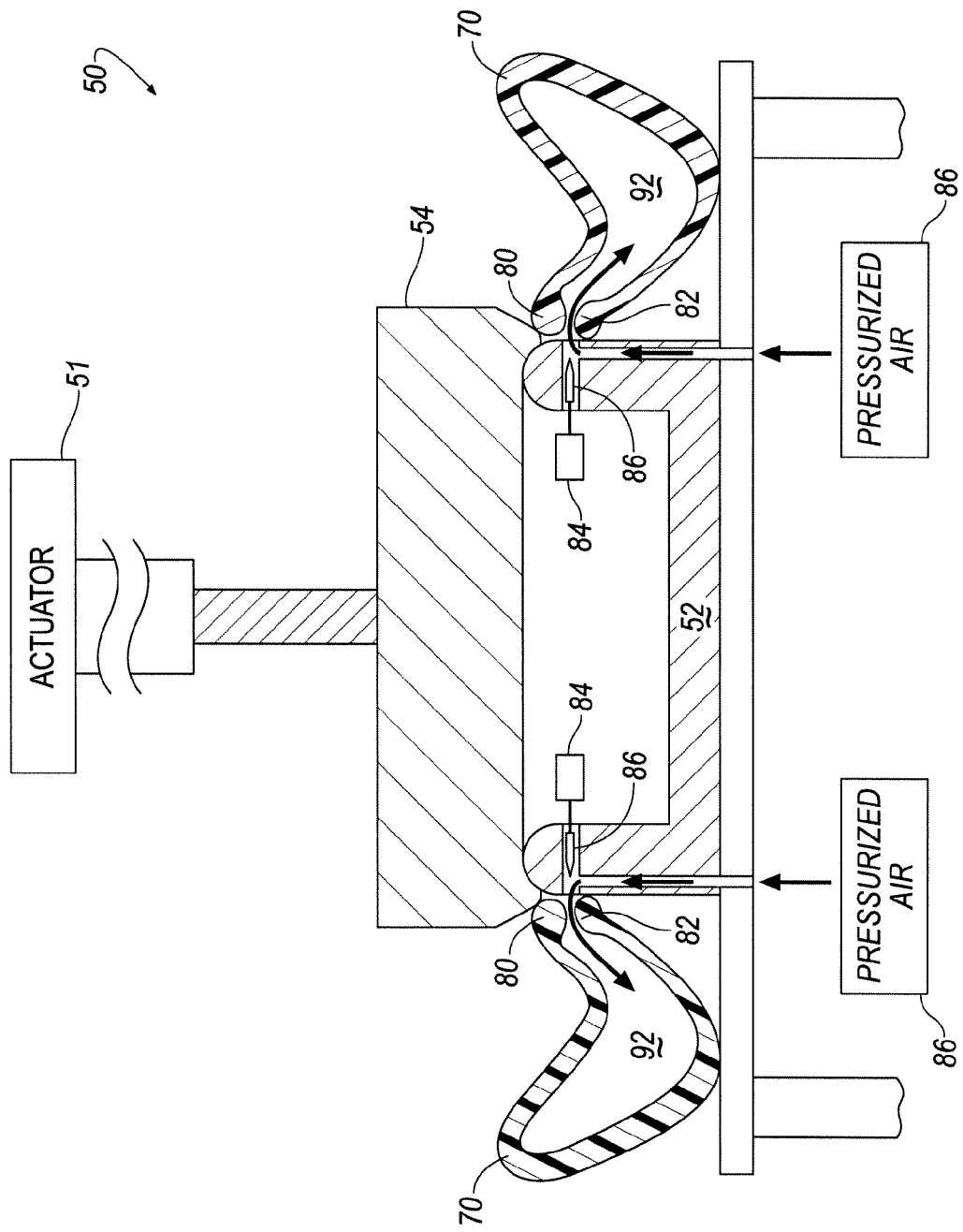
FIG. 23 is the inflator of FIG. 21 shown in a second stage of tire inflation.
Figure 24:
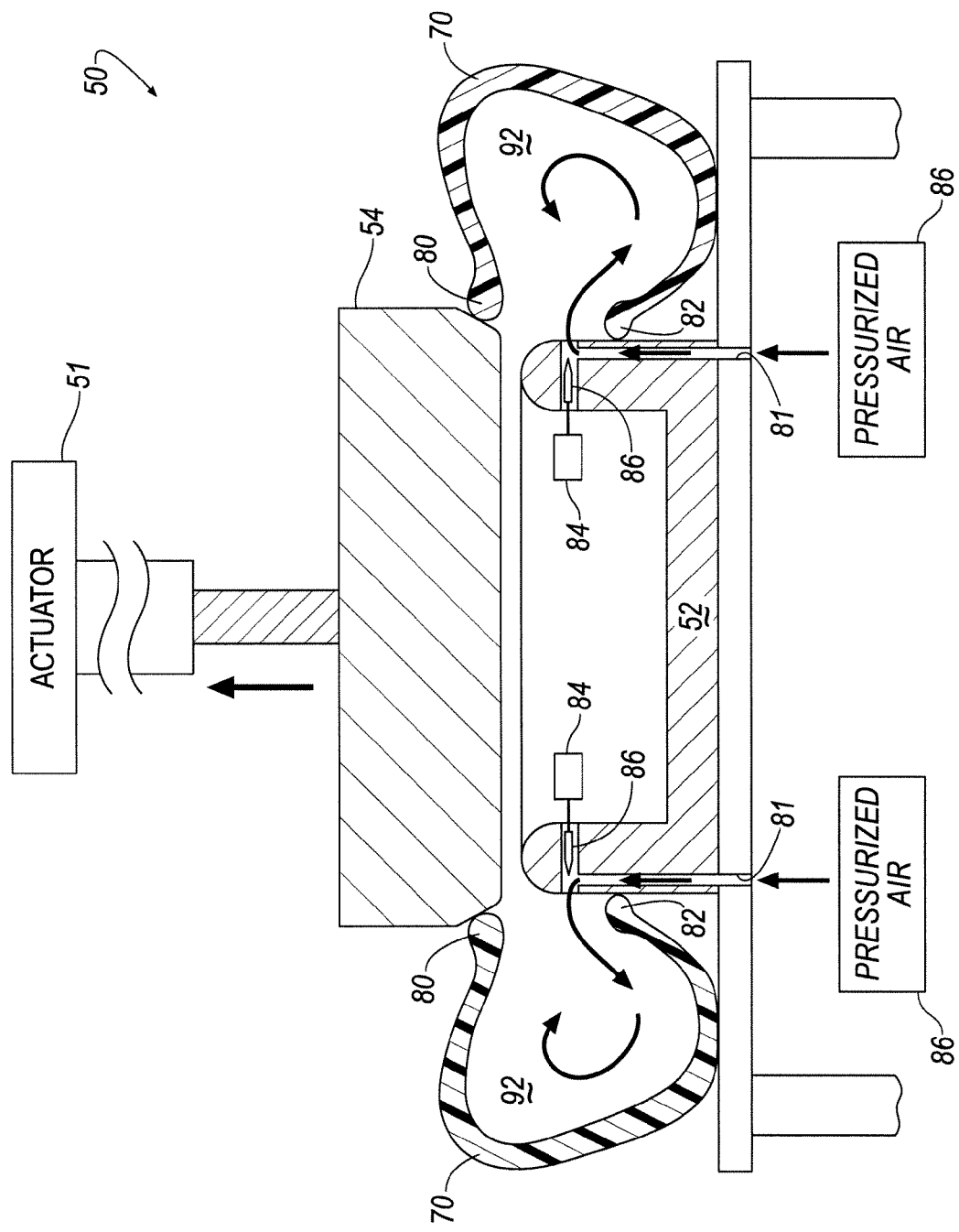
FIG. 24 is the inflator of FIG. 21 shown in a third stage of inflation.
Figure 25:
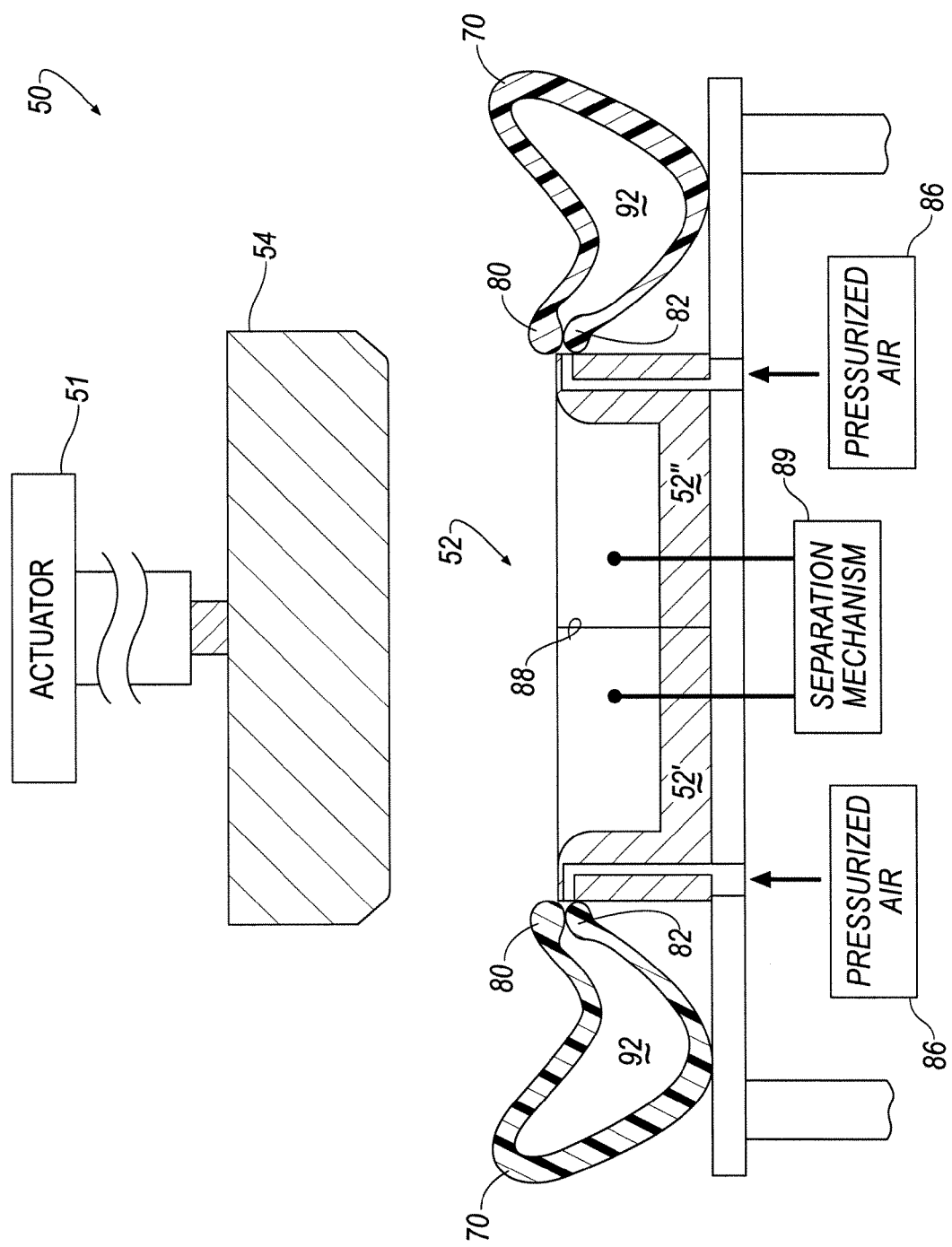
FIG. 25 is yet an additional embodiment of the inflator of the present invention.
Figure 26:
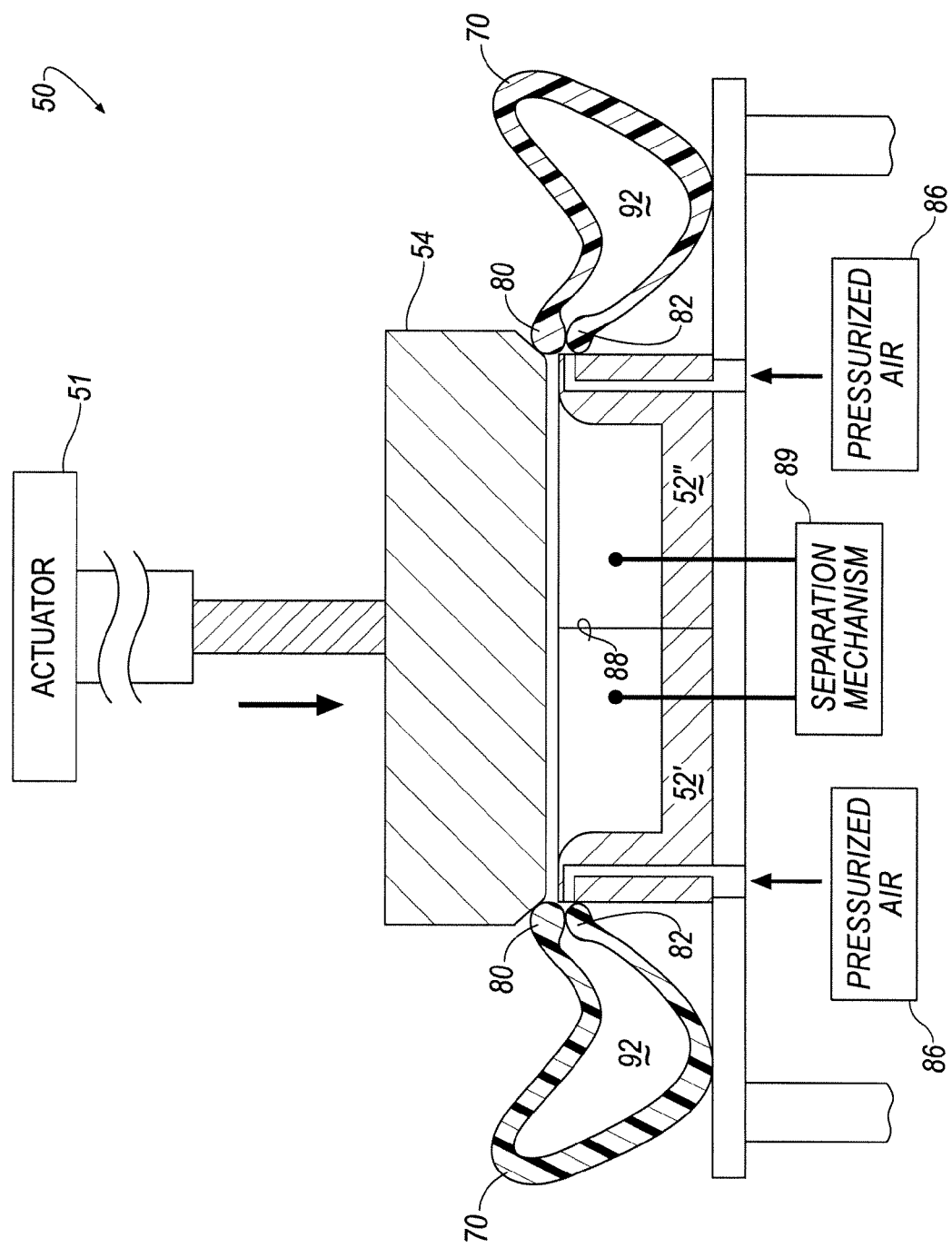
FIG. 26 is the inflator of FIG. 25 shown in first stage of inflation.

When a tire is placed on bottom sealing ring 52 of tire inflator 50, there may be little or no gap between the top bead 80 of tire 70 and the bottom bead 82 of tire 70. If such a condition exists, it may be very difficult, if not impossible, to inflate tire 70 such that it can balloon open to assume its installation configuration. In order to create an egress gap between top bead 80 and lower bead 82, actuator assembly 85 may be provided. Actuator assembly 85 includes actuator 84 connected to a respectively associated pintle 86. Actuator 84 is capable of manipulating pintle 86 in a general horizontal manner such that pintle 86, when fully extended, can wedge itself between top bead 80 and bottom bead 82 thereby creating a gap therebetween. Once pintle is extended (and subsequently retracted) the gap remaining is of sufficient size to allow pressurized air 86 to pass between the egress gap formed by pintle 86 thereby inflating tire 70. The inflation steps are shown in FIGS. 22-24.

Figure 27:
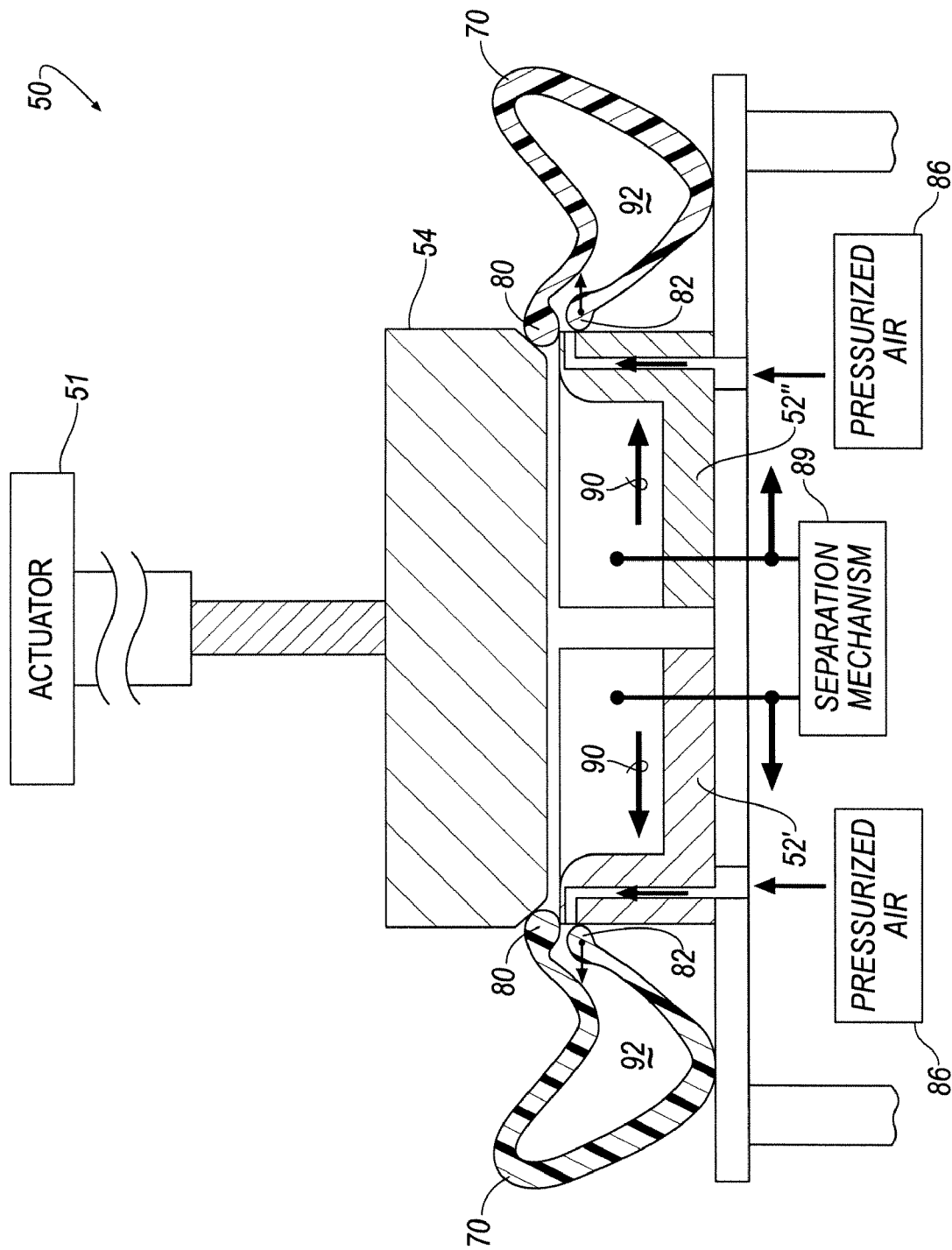
FIG. 27 is the inflator of FIG. 25 shown in a second stage of inflation.
Figure 28:
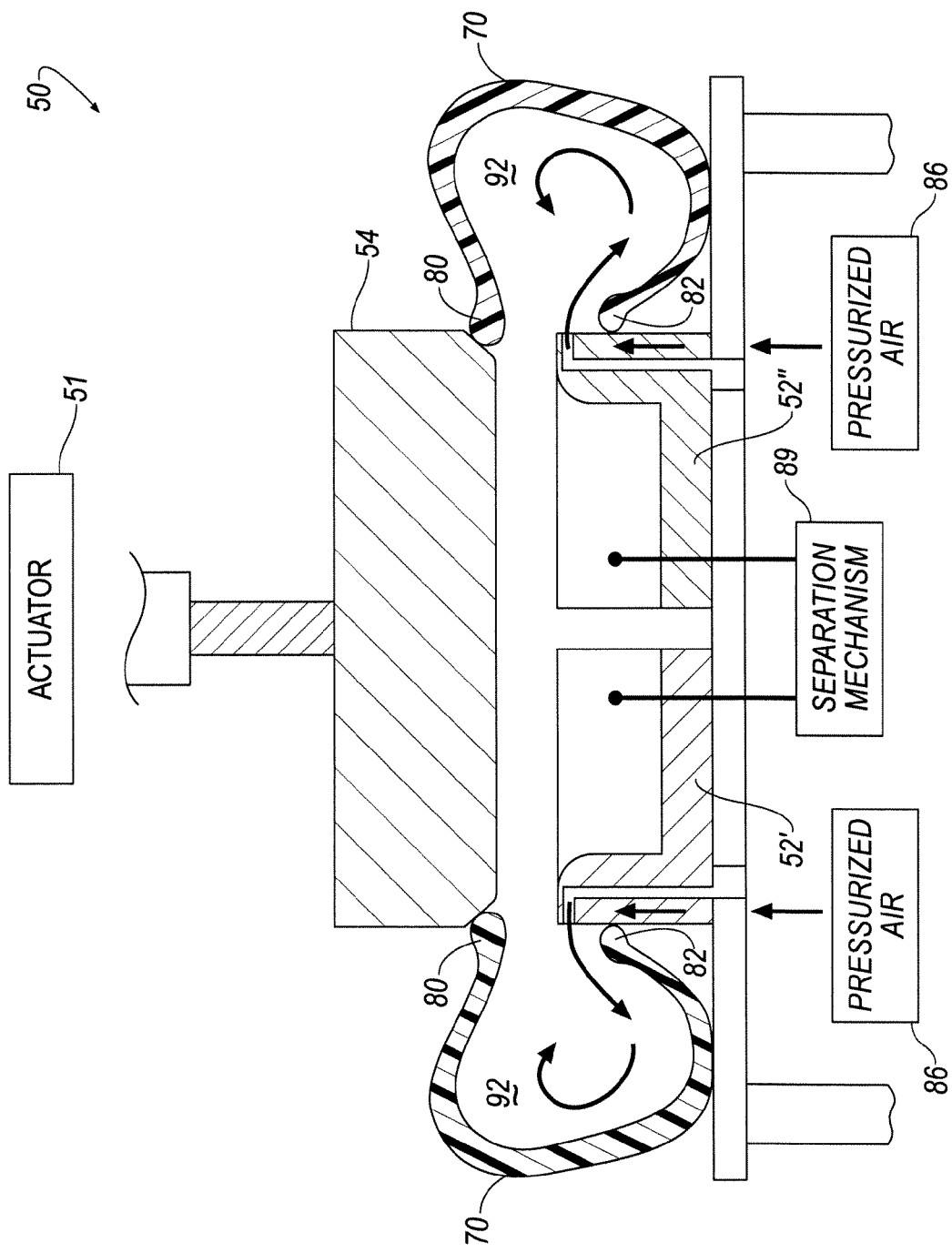
FIG. 28 is the inflator of FIG. 25 shown in a third stage of inflation.

Now referring to FIGS. 25-28, in a second embodiment of the inflator of the present invention, instead of using a pintle to separate top bead 80 from bottom bead 82, bottom sealing ring 52 (a.k.a. mandrel 52) is designed so that its outer circumference can be expanded. One way of accomplishing this expansion is to split mandrel 52 along one or more seams 88 into two or more mandrel portions 52', 52". Each mandrel portion 52', 52" is radially manipulateable 90 by separation mechanism 89 (see FIG. 27). Separation mechanism 89 may include any actuation mechanism including pneumatic, hydraulic, electrical or mechanical. In the depiction of FIG. 27, the two mandrel portions 52', 52" are radially outwardly displaced from one another thereby radially outwardly dislodging bottom bead 82 of tire 70 from top bead 80 of tire 70. This dislodgement between the two beads creates an opening of sufficient size such that pressurized air 86 can travel into an inner volume 92 defined by tire 70, bottom sealing ring 52, and upper sealing ring 54. Pressurized air 86 will then cause the walls of tire 70 to expand and otherwise assume a correct geometry which will enable them to be mounted to a wheel.

What is claimed is:

1. A stacked tire separator, comprising:
   at least one securing arm including a gripping portion movable in a radially-inward direction,
   an axially-movable head coupled to the at least one securing arm, wherein the axially-movable head includes at least one finger movable in a radially-inward direction, and
   an inflator coupled to the at least one securing arm and the axially-movable head, wherein the inflator is defined by
      at least one radially-outwardly directed fluid passage channel, and
      a pintle wedge that is movably-disposed within the at least one radially-outwardly directed fluid passage channel.

2. The stacked tire separator of claim 1, wherein said at least one securing arm and said axially moveable head define:
   means for axially separating at least a first tire from a second tire that are arranged substantially together to define a stack of tires.

3. The stacked tire separator of claim 2, wherein the at least one securing arm defines:
   means for limiting the axial movement of the second tire, wherein the axially moveable head defines
   means for engaging and moving the first tire axially away from the second tire.

4. The stacked tire separator of claim 2, wherein the inflator is arranged within an inner circumferential periphery of the second tire.

5. The stacked tire separator of claim 2, wherein said pintle wedge is movably-disposed in a radially-outward direction within the at least one radially-outwardly directed fluid passage channel.

6. The stacked tire separator of claim 1, wherein said inflator further comprises:
   a source of pressurized fluid connected to the at least one radially-outwardly directed fluid passage channel, and
   an actuator connected to the pintle wedge.

7. The stacked tire separator of claim 6, wherein a top bead of the second tire is arranged substantially adjacent a bottom bead of the second tire to define a seam, wherein the at least one radially-outwardly directed fluid passage channel and the pintle wedge are radially aligned with the seam, wherein the inflator defines:
   means for axially separating the seam, wherein the actuator defines
   means for driving the pintle wedge into the seam for
      axially moving the top bead away from the bottom bead for axially separating the seam for
         defining an axial gap between the top bead and the bottom bead.

8. The stacked tire separator of claim 7, wherein said at least one radially-outwardly directed fluid passage channel defines;
   means for radially directing and passing pressurized fluid from the source of pressurized fluid through the axial gap and into a volume of the second tire, wherein the volume is defined by
      a circumferential tread surface,
      a top side surface extending from the circumferential tread surface, and
      a bottom side surface extending from the circumferential tread surface.

9. Method for separating stacked tires, including the steps of:
   orienting a plurality of nested tires including a penultimate tire and a bottom most tire such that a common axis is at least partially vertically oriented, wherein the orientating step further comprises
      arranging an upper bead of the bottom most tire substantially adjacent a lower bead of the bottom most tire for defining a seam,
   introducing an axial separating force between the penultimate tire and the bottom most tire for axially separating the penultimate tire from the bottom most tire, and introducing a radially outward force to the seam for axially separating the upper bead and the lower bead for defining an axial gap between the upper bead and the lower bead.

10. The method of claim 9, wherein the axial separating force includes lifting the penultimate tire axially away from the bottom most tire.

11. The method of claim 10, further including the step of impeding the axial movement of the bottom most tire.

12. The method of claim 9, wherein the introducing a radially outward force to the seam includes the step of:
   introducing a pintle wedge into the seam, and
   inflating the bottom-most tire by
      introducing pressurized fluid through the axial gap between an upper bead and the lower bead of the bottom most tire.

13. The method of claim 12, further including the step of actuating the pintle wedge with an actuator.

14. The method of claim 9, wherein the introducing a radially outward force to the seam includes the step of:
   disposing the first and second bead adjacent a separation mechanism including a first portion and a second portion, and
   actuating an actuator for moving the first portion and the second portion away from one another in diverging radial directions.

15. A separator, comprising:
   at least one securing arm including a gripping portion movable in a radially-inward direction,
   an axially-movable head coupled to the at least one securing arm, wherein the axially-movable head includes at least one finger movable in a radially-inward direction, and
   an inflator coupled to the at least one securing arm and the axially-movable head, wherein, the inflator includes split mandrel defining
      a first portion that is movable in a first radially-outward direction,
      a second portion that is moveable in a second radially-outward direction, and
      at least one radially-outwardly directed fluid passage channel formed in one or more of the first portion and the second portion.

16. The separator of claim 15, wherein a top bead of a tire is arranged substantially adjacent a bottom bead of the tire to define a seam, wherein the inflator further includes:
   a separation mechanism connected to each of the first portion and the second portion, wherein the separation mechanism defines
      means for moving the first portion in the first radially-outward direction and the second portion away from the first portion in the second radially-outward direction for
         axially moving the top bead away from the bottom bead for
            opening the seam to define an axial gap between the top bead and the bottom bead.

17. The separator of claim 16, wherein the inflator is arranged within an inner circumferential periphery of the second tire.

18. The separator of claim 16, wherein said inflator further comprises:
   a source of pressurized fluid connected to the at least one radially-outwardly directed fluid passage channel.

19. The separator of claim 18, wherein the at least one radially-outwardly directed fluid passage channel is radially aligned with the axial gap.

20. The separator of claim 19, wherein said at least one radially-outwardly directed fluid passage channel defines;
   means for radially directing and passing pressurized fluid from the source of pressurized fluid through the axial gap and into a volume of the tire, wherein the volume is defined by
      a circumferential tread surface,
      a top side surface extending from the circumferential tread surface, and
      a bottom side surface extending from the circumferential tread surface.

21. The separator of claim 15, wherein said at least one securing arm and the axially moveable head define:
   means for axially separating at least a first tire from a second tire that are arranged substantially together to define a stack of tires, wherein the inflator defines
   means for axially separating a top bead arranged substantially adjacent a bottom bead of the second tire.

22. The separator of claim 21, wherein the at least one securing arm defines:
   means for limiting the axial movement of the second tire, wherein the axially moveable head defines
   means for engaging and moving the first tire axially away from the second tire.

* * * * *

UNITED STATES PATENT AND TRADEMARK OFFICE
CERTIFICATE OF CORRECTION

PATENT NO. : 7,556,470 B2  
APPLICATION NO. : 11/959043  
DATED : July 7, 2009  
INVENTOR(S) : Lawrence J. Lawson et al.

Page 1 of 1

It is certified that error appears in the above-identified patent and that said Letters Patent is hereby corrected as shown below:

In Claim 15, line 36 --a-- should be inserted before "split".

Signed and Sealed this

Twenty-second Day of September, 2009

David J. Kappos  
*Director of the United States Patent and Trademark Office*

UNITED STATES PATENT AND TRADEMARK OFFICE
CERTIFICATE OF CORRECTION

PATENT NO. : 7,556,470 B2
APPLICATION NO. : 11/959043
DATED : July 7, 2009
INVENTOR(S) : Lawrence J. Lawson et al.

Page 1 of 1

It is certified that error appears in the above-identified patent and that said Letters Patent is hereby corrected as shown below:

Column 7, Claim 15, line 36 --a-- should be inserted before "split".

This certificate supersedes the Certificate of Correction issued September 22, 2009.

Signed and Sealed this

Twenty-seventh Day of October, 2009

David J. Kappos
*Director of the United States Patent and Trademark Office*